United States Patent
Lee et al.

(10) Patent No.: US 10,644,855 B2
(45) Date of Patent: May 5, 2020

(54) METHOD OF TRANSMITTING UPLINK PHASE TRACKING REFERENCE SIGNAL BY USER EQUIPMENT IN WIRELESS COMMUNICATION SYSTEM AND APPARATUS SUPPORTING SAME

(71) Applicant: LG Electronics Inc., Seoul (KR)

(72) Inventors: Kilbom Lee, Seoul (KR); Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/529,284

(22) Filed: Aug. 1, 2019

(65) Prior Publication Data

US 2019/0356443 A1 Nov. 21, 2019

Related U.S. Application Data

(63) Continuation of application No. 16/383,138, filed on Apr. 12, 2019, which is a continuation of application
(Continued)

(51) Int. Cl.
*H04L 5/00* (2006.01)
*H04W 72/04* (2009.01)
(Continued)

(52) U.S. Cl.
CPC ......... *H04L 5/0048* (2013.01); *H04W 52/146* (2013.01); *H04W 52/16* (2013.01);
(Continued)

(58) Field of Classification Search
CPC ............ H04L 5/0048; H04W 72/0473; H04W 72/0413; H04W 52/34; H04W 52/146;
(Continued)

(56) References Cited

U.S. PATENT DOCUMENTS

2012/0182950 A1 7/2012 Chung et al.
2013/0301542 A1* 11/2013 Krishnamurthy ..... H04W 52/50
370/329

(Continued)

FOREIGN PATENT DOCUMENTS

WO WO 2017200315 11/2017

OTHER PUBLICATIONS

Ericsson, "Remaining details on PTRS design", R1-1720741, 3GPP TSG RAN WG1 Meeting 91, Reno, USA, Nov. 27-Dec. 1, 2017, 15 pages.

(Continued)

*Primary Examiner* — Phong La
(74) *Attorney, Agent, or Firm* — Fish & Richardson P.C.

(57) ABSTRACT

The present invention proposes a method of transmitting and receiving an uplink phase tracking reference signal between a user equipment and a base station in a wireless communication system and an apparatus therefore. According to one embodiment applicable to the present invention, the user equipment can transmit an uplink phase tracking reference signal to the base station using a power boosting level determined based on first information and second information received from the base station.

20 Claims, 17 Drawing Sheets

Related U.S. Application Data

No. 16/213,380, filed on Dec. 7, 2018, now Pat. No. 10,355,842.

(60) Provisional application No. 62/616,459, filed on Jan. 12, 2018, provisional application No. 62/615,932, filed on Jan. 10, 2018, provisional application No. 62/596,111, filed on Dec. 7, 2017.

(51) Int. Cl.
| | | |
|---|---|---|
| *H04W 52/34* | (2009.01) | |
| *H04W 52/32* | (2009.01) | |
| *H04W 52/14* | (2009.01) | |
| *H04W 52/16* | (2009.01) | |
| *H04W 52/36* | (2009.01) | |
| *H04B 7/06* | (2006.01) | |

(52) U.S. Cl.
CPC ......... *H04W 52/325* (2013.01); *H04W 52/34* (2013.01); *H04W 52/367* (2013.01); *H04W 72/0413* (2013.01); *H04W 72/0473* (2013.01); *H04B 7/0691* (2013.01); *H04L 5/005* (2013.01)

(58) Field of Classification Search
CPC .. H04W 52/16; H04W 52/325; H04W 52/367
USPC ......................................................... 370/329
See application file for complete search history.

(56) References Cited

U.S. PATENT DOCUMENTS

| | | | |
|---|---|---|---|
| 2014/0133333 A1 | 5/2014 | Liu | |
| 2014/0233665 A1* | 8/2014 | Clevorn | H04B 7/04 375/267 |
| 2017/0063503 A1* | 3/2017 | Liu | H04L 5/0044 |
| 2017/0064685 A1* | 3/2017 | Rico Alvarino | H04B 7/0456 |
| 2018/0183556 A1 | 6/2018 | Shin | |
| 2018/0205528 A1* | 7/2018 | Bai | H04L 5/0005 |
| 2018/0242327 A1* | 8/2018 | Frenne | H04B 7/0404 |
| 2018/0269954 A1 | 9/2018 | Raghavan | |
| 2018/0359069 A1 | 12/2018 | Nam | |
| 2019/0158171 A1* | 5/2019 | Ren | H04B 7/0663 |

OTHER PUBLICATIONS

Ericsson, "Summary of PTRS open issues", R1-1716736, 3GPP TSG-RAN WG1 NR Ad Hoc #3, Nagoya, Japan, Sep. 18-21, 2017 7 pages.

Ericsson, "Summary of PTRS open issues", R1-1721441, 3GPP TSG RAN WG1 Meeting #91, Reno, USA, Nov. 27-Dec. 1, 2017, 9 pages.

Ericsson, "Thursday evening summary of PTRS", R1-1721637, 3GPP TSG RAN WG1 Meeting #91, Reno, USA, Nov. 27-Dec. 1, 2017, 9 pages.

Intel Corporation, "Remaining Details on PT-RS", R1-1717374, 3GPP TSG RAN WG1 Meeting 90bis, Prague, CZ, Oct. 9-13, 2017, 10 pages.

LG Electronics el al., "WF on PT-RS power boosting", R1-1721517, 3GPP TSG RAN WG1 Meeting RAN1#91, Reno, USA, dated Nov. 27-Dec. 1, 2017, 7 pages.

NTT Docomo, Inc., "Remaining details on PT-RS", R1-1721358, 3GPP TSG RAN WG1 Meeting #91, Reno, USA, Nov. 27-Dec. 1, 2017, 6 pages.

PCT International Search Report and Written Opinion in International Application No. PCT/KR2018/015535, dated Apr. 3, 2019, 10 pages.

Samsung, "Discussion on PT-RS", R1-1717631, 3GPP TSG RAN WG1 Meeting 90bis, Prague, CZ, Oct. 9-13, 2017, 9 pages.

Vivo, "WF on UL PTRS Port Indication", R1-1721664, RAN#91, Reno, US, dated Oct. 2017, 8 pages.

* cited by examiner

FIG. 8

| Configuration type 1<br>CDM-T & CDM-F | Configuration type 2<br>CDM-T & CDM-F |
|---|---|
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |

[Full-coherent]

antennas $\dfrac{1}{4}\begin{bmatrix} 1 & 1 & 1 & 1 \\ 1 & -1 & 1 & -1 \\ j & j & -j & -j \\ j & -j & -j & -j \end{bmatrix}$ layers

[Non-coherent]

$\dfrac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$

[Partial-coherent]

$\dfrac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$

FIG. 18

$$\frac{1}{2\sqrt{2}} \begin{bmatrix} 1 & 1 & 0 & 0 \\ 0 & 0 & 1 & 1 \\ 1 & -1 & 0 & 0 \\ 0 & 0 & 1 & -1 \end{bmatrix}$$ → SRS port group #0
→ SRS port group #1

METHOD OF TRANSMITTING UPLINK PHASE TRACKING REFERENCE SIGNAL BY USER EQUIPMENT IN WIRELESS COMMUNICATION SYSTEM AND APPARATUS SUPPORTING SAME

CROSS-REFERENCE TO RELATED APPLICATIONS

This application is a continuation of U.S. application Ser. No. 16/383,138, filed on Apr. 12, 2019, now allowed, which is a continuation of U.S. application Ser. No. 16/213,380 filed on Dec. 7, 2018, now U.S. Pat. No. 10,355,842, which claims the benefit of U.S. Provisional Applications No. 62/596,111 filed on Dec. 7, 2017, No. 62/615,932 filed on Jan. 10, 2018, and No. 62/616,459 filed on Jan. 12, 2018, all of which are hereby incorporated by reference as if fully set forth herein.

BACKGROUND OF THE INVENTION

Field of the Invention

Following description relates to a wireless communication system, and more particularly, to a method of transmitting an uplink phase tracking reference signal by a user equipment in a wireless communication system and an apparatus supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

In particular, since a method of transmitting and receiving a signal through various frequency bands is considered, a concept for a phase tracking reference signal (PT-RS) for estimating phase noise between a user equipment and a base station on the various frequency bands is in discussion in various ways.

SUMMARY OF THE INVENTION

A technical task of the present invention is to provide a method of transmitting an uplink phase tracking reference signal by a user equipment in a wireless communication system and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method of transmitting an uplink phase tracking reference signal by a user equipment to a base station in a wireless communication system and an apparatus supporting the same.

In an aspect of the present invention, provided herein is a method of transmitting a phase tracking reference signal (PT-RS) by a user equipment (UE) in a wireless communication system, the method comprising: receiving, from a base station, (i) first information regarding power boosting for transmission of the PT-RS and (ii) second information regarding a precoding matrix for transmission of a Physical Uplink Shared Channel (PUSCH); determining a power boosting level based on the first information and the second information, wherein the power boosting level is related to a ratio of PUSCH power to PT-RS power per layer and per resource element (RE); and transmitting, to the base station, the PT-RS using the determined power boosting level. Herein, determining the power boosting level based on the first information and the second information comprises: based on the precoding matrix indicated by the second information being a partial coherent precoding matrix or a non-coherent precoding matrix, determining the power boosting level based on a number of PT-RS ports.

In another aspect of the present invention, provided herein is a user equipment (UE) configured to transmit a phase tracking reference signal (PT-RS) in a wireless communication system, the UE comprising: a radio frequency (RF) module; at least one processor; and at least one computer memory operably connectable to the at least one processor and storing instructions that, when executed, cause the at least one processor to perform operations. Herein the operations comprises: receiving, through the RF module and from a base station, (i) first information regarding power boosting for transmission of the PT-RS and (ii) second information regarding a precoding matrix for transmission of a Physical Uplink Shared Channel (PUSCH); determining a power boosting level based on the first information and the second information, wherein the power boosting level is related to a ratio of PUSCH power to PT-RS power per layer and per resource element (RE); and transmitting, through the RF module and to the base station, the PT-RS using the determined power boosting level, wherein determining the power boosting level based on the first information and the second information comprises: based on the precoding matrix indicated by the second information being a partial coherent precoding matrix or a non-coherent precoding matrix, determining the power boosting level based on a number of PT-RS ports.

Herein, the first information may indicate a plurality of power boosting levels, and the determining the power boosting level based on the first information and the second information may comprise determining, based on the second information, one of the plurality of power boosting levels.

In particular, the determining the power boosting level based on the first information and the second information may comprise: based on the second information indicating the partial coherent precoding matrix, determining the power boosting level as a first power boosting level from among the plurality of power boosting levels indicated by the first information; and based on the second information indicating the non-coherent precoding matrix, determining the power boosting level as a second power boosting level different from the first power boosting level, from among the plurality of power boosting levels indicated by the first information.

In the aforementioned configuration, the determining the power boosting level based on the number of PT-RS ports may comprise: based on (i) the second information indicating the partial coherent precoding matrix, and (ii) the number of PT-RS ports being equal to 1: determining the power boosting level to be 0 dB in a state in which a number of PUSCH layers is equal to 2 or 3; and determining the power boosting level to be 3 dB in a state in which a number of PUSCH layers is equal to 4.

In the aforementioned configuration, the determining the power boosting level based on the number of PT-RS ports may comprise: based on (i) the second information indicating the partial coherent precoding matrix, and (ii) the number of PT-RS ports being equal to 2: determining the power boosting level to be 3 dB in a state in which a number of PUSCH layers is equal to 2 or 3; and determining the power boosting level to be 6 dB in a state in which a number of PUSCH layers is equal to 4.

In the aforementioned configuration, the determining the power boosting level based on the number of PT-RS ports may comprise: based on (i) the second information indicating the non-coherent precoding matrix, and (ii) the number of PT-RS ports being equal to 1: determining the power boosting level to be 0 dB.

In the aforementioned configuration, the determining the power boosting level based on the number of PT-RS ports may comprise: based on (i) the second information indicating the non-coherent precoding matrix, and (ii) the number of PT-RS ports being equal to 2: determining the power boosting level to be 3 dB.

In the aforementioned configuration, the second information may relate to a transmit rank indicator (TRI) and a transmit precoding matrix indicator (TPMI) for the precoding matrix for the transmission of the PUSCH.

In particular, the second information may indicate whether the precoding matrix for the transmission of the PUSCH is the partial coherent precoding matrix or the non-coherent precoding matrix.

Additionally, the UE may determine that the transmission of the PUSCH is non-codebook based; and based on the transmission of the PUSCH being non-codebook based, the UE may determine the power boosting level based on the number of PT-RS ports by: based on the number of PT-RS ports being equal to 1, determining the power boosting level to be 0 dB; and based on the number of PT-RS ports being equal to 2, determining the power boosting level to be 3 dB.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present invention, a user equipment (UE) can boost transmit power of a PT-RS based on a precoding matrix provided (indicated) by a base station. In particular, according to the present invention, although the UE boosts the transmit power of the PT-RS, the UE is able to keep an antenna power constraint (e.g., consistently maintain power per antenna in the aspect of average or long term) required by a standard technology.

Since the UE does not require an additional power amplifier to boost the transmit power of the PT-RS, it is able to reduce the cost of the UE.

Also, the UE is able to control a PT-RS power boosting level in an antenna level of a UE within a predetermined range, so the UE is able to consistently maintain a power constraint according to an antenna.

Therefore, According to the present invention, the UE is able to transmit PT-RS by applying a certain level of power boosting while keeping the power constraint for each antenna constant, and the base station is able to perform more accurate channel estimation using the PT-RS.

The above-described aspects of the present invention are merely a part of preferred embodiments of the present invention. Those skilled in the art will derive and understand various embodiments reflecting the technical features of the present invention from the following detailed description of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 8 is a diagram briefly illustrating two DM-RS configuration types applicable to the present invention;

FIG. 16 illustrates an example basic signal operation configuration.

FIG. 18 illustrates an example configuration of SRS ports.

DETAILED DESCRIPTION OF THE INVENTION

Figure 1:
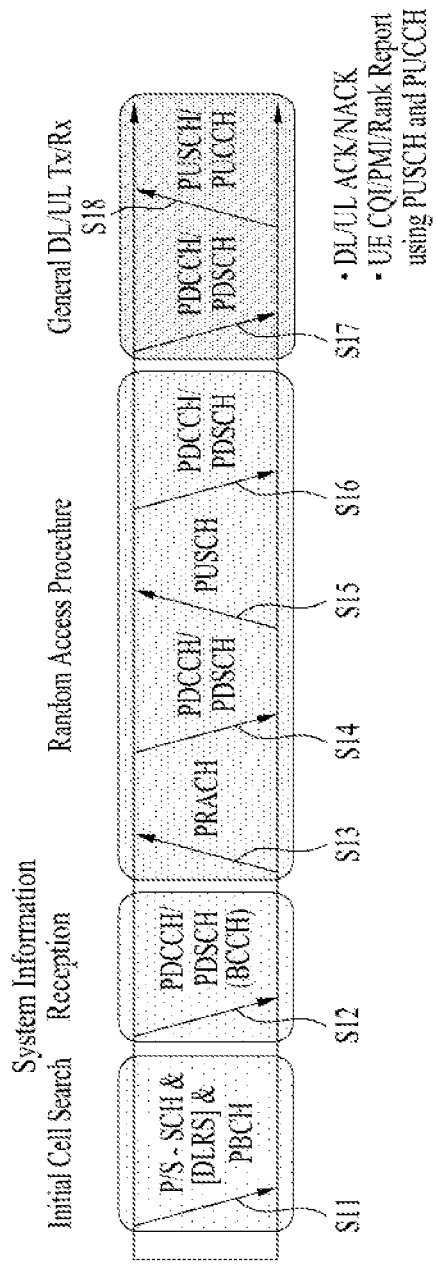
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

In order to make the technological characteristics of the present invention to be more clearly understood, embodiments of the present invention are explained centering on 3GPP NR system. However, the embodiments proposed by the present invention can be identically applied to a different wireless system (e.g., 3GPP LTE, IEEE 802.16, IEEE 802.11, etc.).

1. NR System 1.1. Physical Channels and Signal Transmission and Reception Method Using the Same In a wireless access system, a UE receives information from an gNB on a DL and transmits information to the gNB on a UL. The information transmitted and received between the UE and the gNB includes general data information and various types of control information. There are many physical channels according to the types/usages of information transmitted and received between the gNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an gNB. Specifically, the UE synchronizes its timing to the gNB and acquires information such as a cell Identifier (ID) by receiving a Primary Synchronization Channel (P-SCH) and a Secondary Synchronization Channel (S-SCH) from the gNB.

Then the UE may acquire information broadcast in the cell by receiving a Physical Broadcast Channel (PBCH) from the gNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the gNB, the UE may perform a random access procedure with the gNB (S13 to S16). In the random access procedure, the UE may transmit a preamble on a Physical Random Access Channel (PRACH) (S13) and may receive a Random Access Response (RAR) via a PDCCH and a PDSCH associated with the PDCCH (S14). The UE transmits Physical Uplink Shared Channel (PUSCH) using scheduling information included in the RAR, and perform a contention resolution procedure including reception of a PDCCH signal and a PDSCH signal corresponding to the PDCCH signal (S16).

After the above procedure, the UE may receive a PDCCH and/or a PDSCH from the gNB (S17) and transmit a Physical Uplink Shared Channel (PUSCH) and/or a Physical Uplink Control Channel (PUCCH) to the gNB (S18), in a general UL/DL signal transmission procedure.

Control information that the UE transmits to the gNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Numerologies

The NR system to which the present invention is applicable supports various OFDM (Orthogonal Frequency Division Multiplexing) numerologies shown in the following table. In this case, the value of numerology parameter μ and cyclic prefix information per carrier bandwidth part can be signaled in DL and UL, respectively. For example, the value of numerology parameter μ and cyclic prefix information per downlink carrier bandwidth part may be signaled though DL-BWP-mu and DL-MWP-cp corresponding to higher layer signaling. As another example, the value of numerology parameter μ and cyclic prefix information per uplink carrier bandwidth part may be signaled though UL-BWP-mu and UL-MWP-cp corresponding to higher layer signaling.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |

TABLE 1-continued

| μ | Δf = $2^\mu \cdot 15$ [kHz] | Cyclic prefix |
|---|---|---|
| 3 | 120 | Normal |
| 4 | 240 | Normal |

1.3 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

For numerology parameter μ or subcarrier spacing Δf based on the parameter, slots may be numbered within one subframe in ascending order like $$n_s^\mu \in \{0, \ldots, N_{slot}^{subframe,\mu} - 1\}$$

and may also be numbered within a frame in ascending order like $$n_{s,f}^\mu \in \{0, \ldots, N_{slot}^{frame,\mu} - 1\}.$$

In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 2 shows the number of OFDM symbols in each slot/frame/subframe in the case of the normal cyclic prefix, and Table 3 shows the number of OFDM symbols in each slot/frame/subframe in the case of the extended cyclic prefix.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 2:
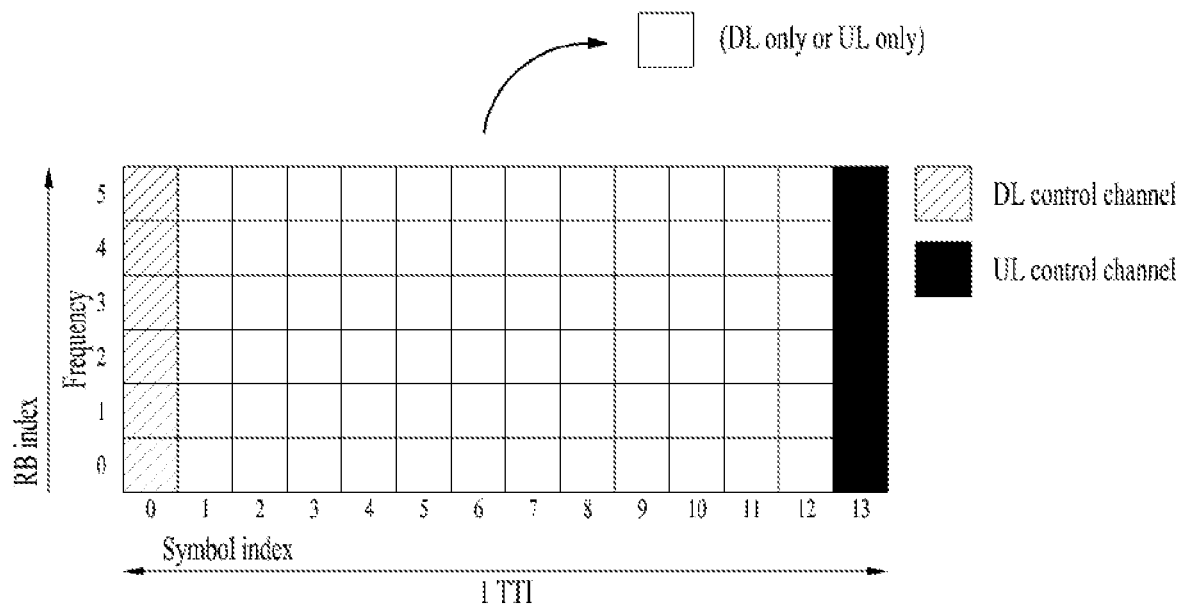
FIG. 2 is a diagram illustrating a self-contained skot structure applicable to the present invention.

FIG. 2 is a diagram illustrating a self-contained slot structure applicable to the present invention.

In FIG. 2, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 2.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

1.4. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 3:
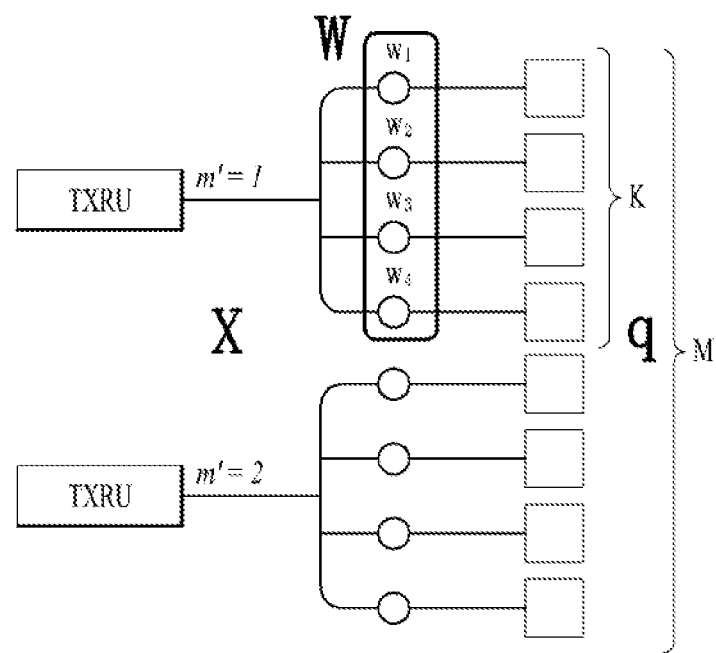
FIGS. 3 and 4 are diagrams illustrating representative connection methods for connecting TXRUs to antenna elements.
Figure 4:
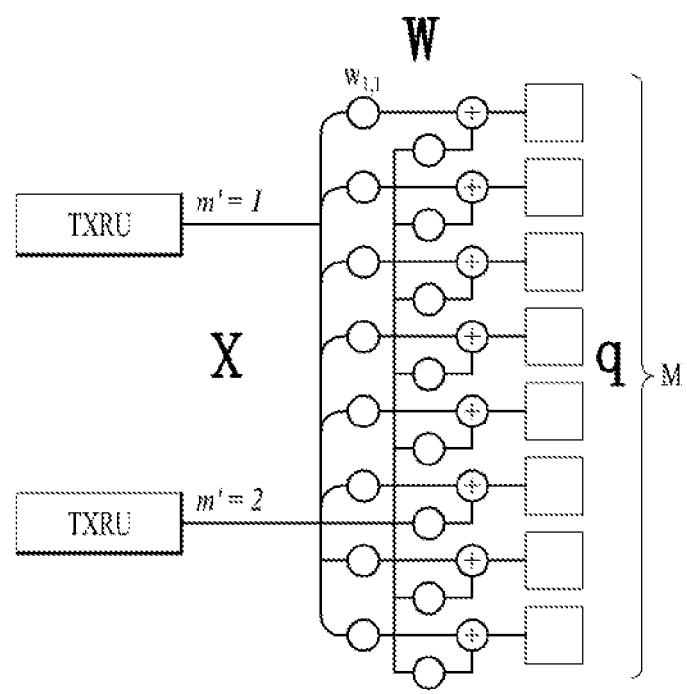

FIGS. 3 and 4 are diagrams illustrating representative methods for connecting TXRUs to antenna elements. Here, the TXRU virtualization model represents the relationship between TXRU output signals and antenna element output signals.

FIG. 3 shows a method for connecting TXRUs to sub-arrays. In FIG. 3, one antenna element is connected to one TXRU.

Meanwhile, FIG. 4 shows a method for connecting all TXRUs to all antenna elements. In FIG. 4, all antenna element are connected to all TXRUs. In this case, separate addition units are required to connect all antenna elements to all TXRUs as shown in FIG. 4.

In FIGS. 3 and 4, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 3 has a disadvantage in that it is difficult to achieve beamforming focusing but has an advantage in that all antennas can be configured at low cost.

On the contrary, the configuration shown in FIG. 4 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 5:
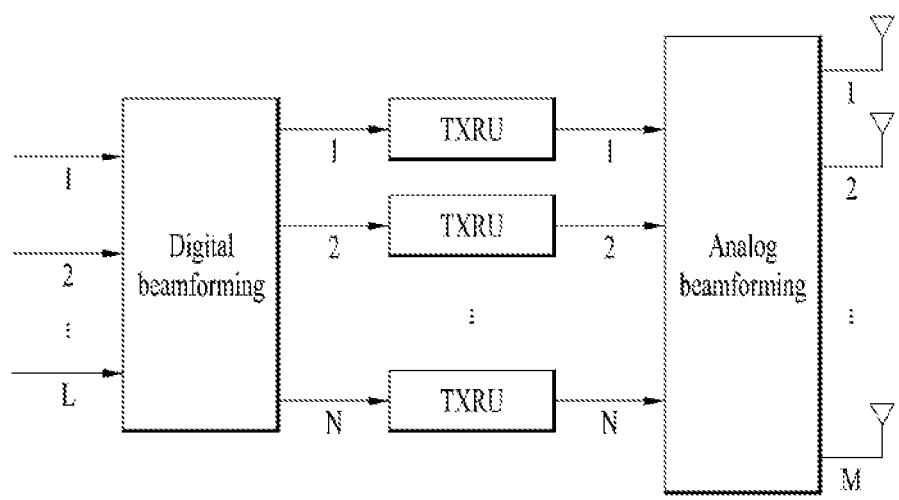
FIG. 5 is a schematic diagram illustrating a hybrid beamforming structure according to an embodiment of the present invention from the perspective of TXRUs and physical antennas.

FIG. 5 is a schematic diagram illustrating a hybrid beamforming structure according to an embodiment of the present invention from the perspective of TXRUs and physical antennas. In FIG. 5, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific slot (at least with respect to synchronization signals, system information, paging, etc.) and then perform signal transmission in order to allow all UEs to have reception opportunities has been considered in the NR system to which the present invention is applicable.

Figure 6:
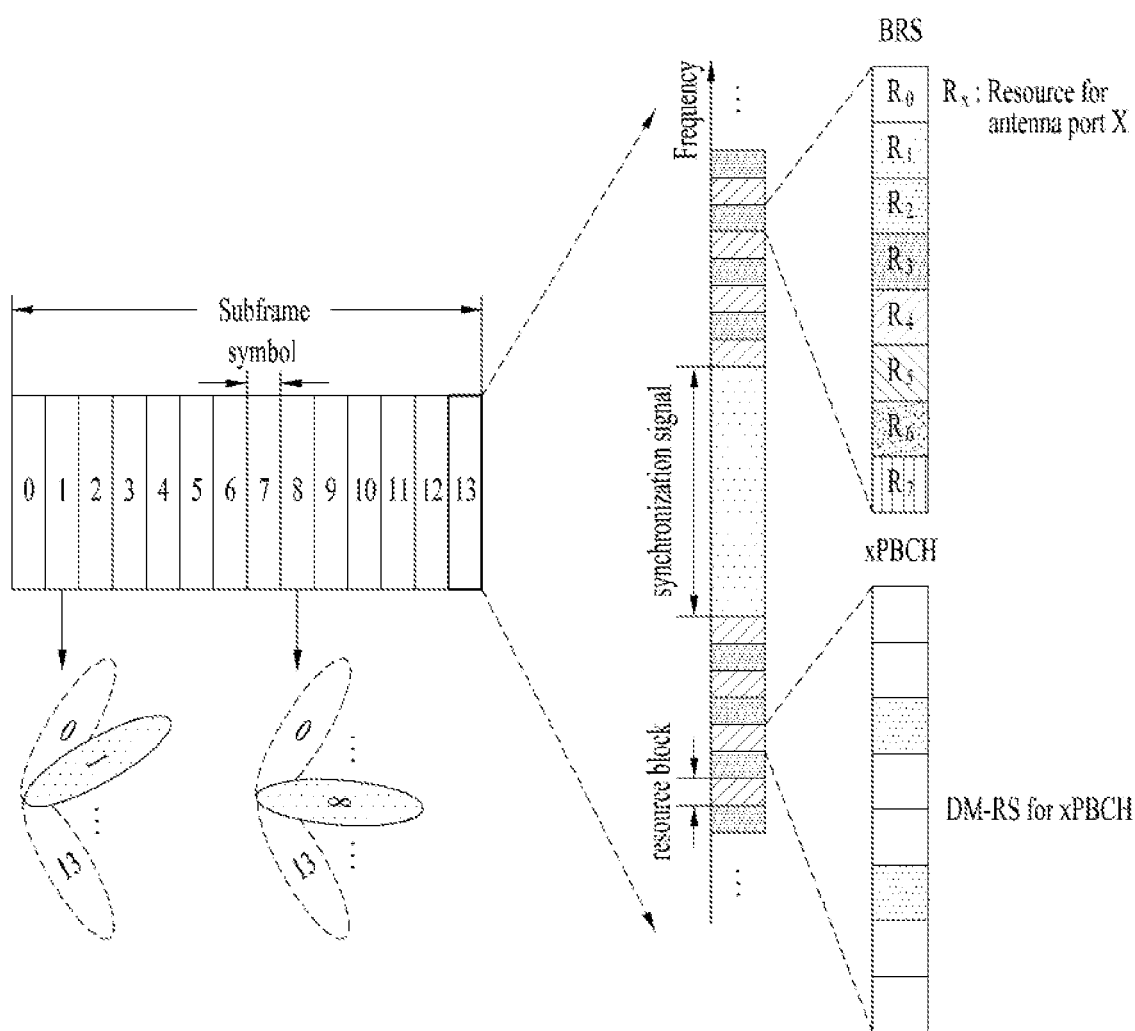
FIG. 6 is a diagram schematically illustrating the beam sweeping operation for synchronization signals and system information during a downlink (DL) transmission process according to an embodiment of the present invention.

FIG. 6 is a diagram schematically illustrating the beam sweeping operation for synchronization signals and system information during a downlink (DL) transmission process according to an embodiment of the present invention In FIG. 6, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as described in FIG. 6, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

1.5. PT-RS (Phase Tracking Reference Signal)

Hereinafter, phase noise will be described. Jitter, which occurs in the time domain, may appear as phase noise in the frequency domain. Such phase noise randomly changes the phase of the received signal in the time domain as shown in the following equation.

$$r_n = s_n e^{j\phi_n} \text{ where} \quad \text{[Equation 1]}$$

$$s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 1, Equation 2 is obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)n/N} \quad \text{[Equation 2]}$$

In Equation 2, the parameters $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)n/N}$$

indicate common phase error (CPE) and inter-cell interference (ICI), respectively. In this case, as phase noise correlation increases, the value of the CPE in Equation 2 increases. Such CPE can be considered as a kind of carrier frequency offset in a WLAN system, but from the perspective of the UE, the CPE and CFO could be interpreted as to be similar to each other.

By performing CPE/CFO estimation, the UE can eliminate CPE/CFO corresponding to phase noise in the frequency domain. In addition, to correctly decode a received signal, the UE should perform the CPE/CFO estimation before decoding the received signal. Accordingly, the eNB can transmit a certain signal to the UE in order for the UE to perform the CPE/CFO estimation accurately. That is, the main purpose of such a signal is to estimate phase noise. To this end, a pilot signal previously shared between the eNB and UE in advance may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

1.5.1. Time Domain Pattern (or Time Density)

Figure 7:
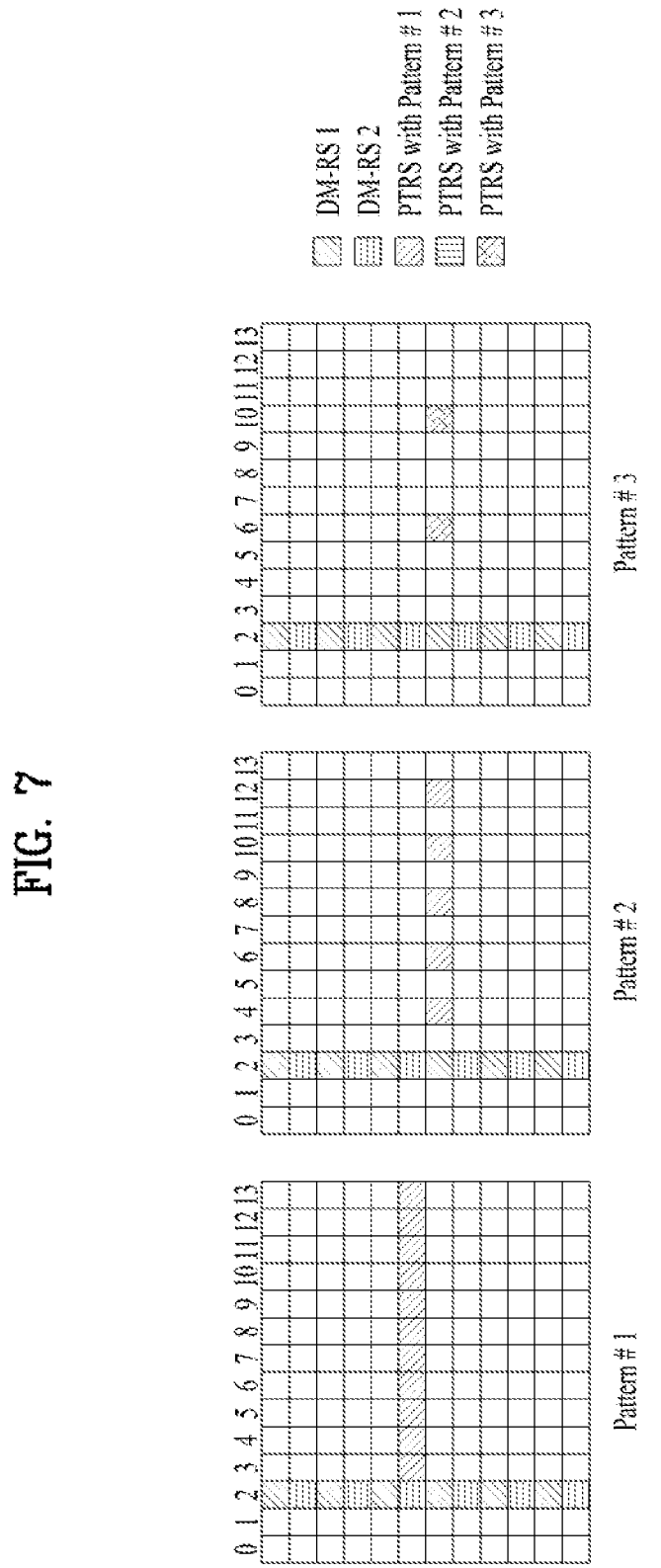
FIG. 7 is a diagram illustrating a time domain pattern of a PT-RS applicable to the present invention.

FIG. 7 is a diagram illustrating a time domain pattern of a PT-RS applicable to the present invention.

As shown in FIG. 7, a PT-RS may have a different pattern according to an MCS (Modulation and Coding Scheme) level.

TABLE 4

| MCS level | PT-RS time pattern |
|---|---|
| (64QAM, CR = 1/3) <= MCS < (64QAM, CR = 1/2) | #3 |
| (64QAM, CR = 1/2) <= MCS < (64QAM, CR = 5/6) | #2 |
| (64QAM, CR = 5/6) <= MCS | #1 |

As shown in FIG. 7 and Table 4, a PT-RS can be transmitted in a manner of being mapped with a different pattern according to an MCS level.

More generally, the configuration above can be defined as follows. In particular, a time domain pattern (or time density) of the PT-RS can be defined as a table described in the following.

TABLE 5

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In this case, time density 1 corresponds to a pattern #1 of FIG. 7, time density 2 corresponds to a pattern #2 of FIG. 7, and time density 4 may correspond to a pattern #3 of FIG. 7.

Parameters ptrs-MCS1, ptrs-MCS2, ptrs-MCS3, and ptrs-MCS4 constructing Table 5 can be defined by higher layer signaling.

1.5.2. Frequency Domain Pattern (or Frequency Density)

A PT-RS according to the present invention can be transmitted in a manner of being mapped to 1 subcarrier in every 1 RB (Resource Block), 2 RBs or 4 RBs. In this case, a frequency domain pattern (or frequency density) of the PT-RS can be configured according to a size of a scheduled bandwidth.

For example, a frequency domain pattern may have frequency density shown in Table 6 according to a scheduled bandwidth.

TABLE 6

| Scheduled BW | Frequency density |
|---|---|
| 0 < $N_{RB}$ <= 4 | No PT-RS |
| 5 < $N_{RB}$ <= 8 | 1 |

TABLE 6-continued

| Scheduled BW | Frequency density |
| --- | --- |
| 9 < $N_{RB}$ <= 16 | 1/2 |
| 17 < $N_{RB}$ <= 32 | 1/4 |

In this case, frequency density 1 corresponds to a frequency domain pattern that a PT-RS is transmitted in a manner of being mapped to 1 subcarrier in every 1 RB. Frequency density ½ corresponds to a frequency domain pattern that a PT-RS is transmitted in a manner of being mapped to 1 subcarrier in every 2 RBs. Frequency density ¼ corresponds to a frequency domain pattern that a PT-RS is transmitted in a manner of being mapped to 1 subcarrier in every 4 RBs.

More generally, the configuration above can be defined as follows. In particular, a frequency domain pattern (or frequency density) of the PT-RS can be defined as a table described in the following.

TABLE 7

| Scheduled bandwidth | Frequency density ($K_{PT-RS}$) |
| --- | --- |
| $N_{RB} < N_{RB0}$ | PT-RS is not present |
| $N_{RB0} \le N_{RB} < N_{RB1}$ | 2 |
| $N_{RB1} \le N_{RB}$ | 4 |

In this case, frequency density 2 corresponds to a frequency domain pattern that a PT-RS is transmitted in a manner of being mapped to 1 subcarrier in every 2 RBs and frequency density 4 corresponds to a frequency domain pattern that a PT-RS is transmitted in a manner of being mapped to 1 subcarrier in every 4 RBs.

In the configuration above, $N_{RB0}$ and $N_{RB1}$ corresponding to reference values of a scheduled bandwidth for determining frequency density can be defined by higher layer signaling.

1.6. DM-RS (Demodulation Reference Signal)

In NR system to which the present invention is applicable, a DM-RS can be transmitted and received through a front-loaded structure. Or, an additional DM-RS of the front-loaded DM-RS can be additionally transmitted and received.

A front-loaded DM-RS can support fast decoding. The first OFDM symbol on which the front-loaded DM-RS is loaded can be determined by the $3^{rd}$ (e.g., l=2) or $4^{th}$ OFDM symbol (e.g., l=3). A location of the first OFDM symbol can be indicated by a PBCH (Physical Broadcast Channel).

The number of OFDM symbols occupied by the front-loaded DM-RS can be indicated by a combination of DCI (Downlink Control Information) and RRC (Radio Resource Control) signaling.

The additional DM-RS can be configured for a user equipment of high speed. The additional DM-RS can be located at the middle/last symbol(s) within a slot. When one front-loaded DM-RS symbol is configured, the additional DM-RS can be assigned to 0 to 3 OFDM symbols. When two front-loaded DM-RS symbols are configured, the additional DM-RS can be assigned to 0 or 2 OFDM symbols.

The front-loaded DM-RS is configured by two types and one of the two types can be indicated via higher layer signaling (e.g., RRC signaling).

FIG. 8 is a diagram briefly illustrating two DM-RS configuration types applicable to the present invention.

In FIG. 8, P0 to P11 may correspond to port number 1000 to 1011, respectively. A DM-RS configuration type actually set to a user equipment among the two DM-RS configuration types can be indicated via higher layer signaling (e.g., RRC).

The DM-RS configuration type 1 can be classified as follows according to the number of OFDM symbols to which a front loaded DM-RS is assigned.

DM-RS Configuration Type 1 and the Number of OFDM Symbols to which a Front Loaded DM-RS is Assigned=1

Maximum 4 ports (e.g., P0~P3) can be multiplexed based on length-2 F-CDM (Frequency-Code Division Multiplexing) and FDM (Frequency Division Multiplexing) methods. RS density can be configured by 6 REs per port within an RB (Resource Block).

DM-RS Configuration Type 1 and the Number of OFDM Symbols to which a Front Loaded DM-RS is Assigned=2

Maximum 8 ports (e.g., P0~P7) can be multiplexed based on length-2 F-CDM (Frequency-Code Division Multiplexing), length-2 T-CDM (Time-Code Division multiplexing), and FDM (Frequency Division Multiplexing) methods. In this case, when the existence of a PT-RS is configured via higher layer signaling, T-CDM can be fixed by [1 1]. RS density can be configured by 12 REs per port within an RB.

The DM-RS configuration type 2 can be classified as follows according to the number of OFDM symbols to which a front loaded DM-RS is assigned.

DM-RS Configuration Type 2 and the Number of OFDM Symbols to which a Front Loaded DM-RS is Assigned=1

Maximum 6 ports (e.g., P0~P5) can be multiplexed based on length-2 F-CDM and FDM methods. RS density can be configured by 4 REs per port within an RB (Resource Block).

DM-RS Configuration Type 2 and the Number of OFDM Symbols to which a Front Loaded DM-RS is Assigned=2

Maximum 12 ports (e.g., P0~P11) can be multiplexed based on length-2 F-CDM, length-2 T-CDM, and FDM methods. In this case, when the existence of a PT-RS is configured via higher layer signaling, T-CDM can be fixed by [1 1]. RS density can be configured by 8 REs per port within an RB.

Figure 9:
FIG. 9 is a diagram briefly illustrating an example for a front loaded DM-RS of a DM-RS configuration type 1 applicable to the present invention.
Figure 9:
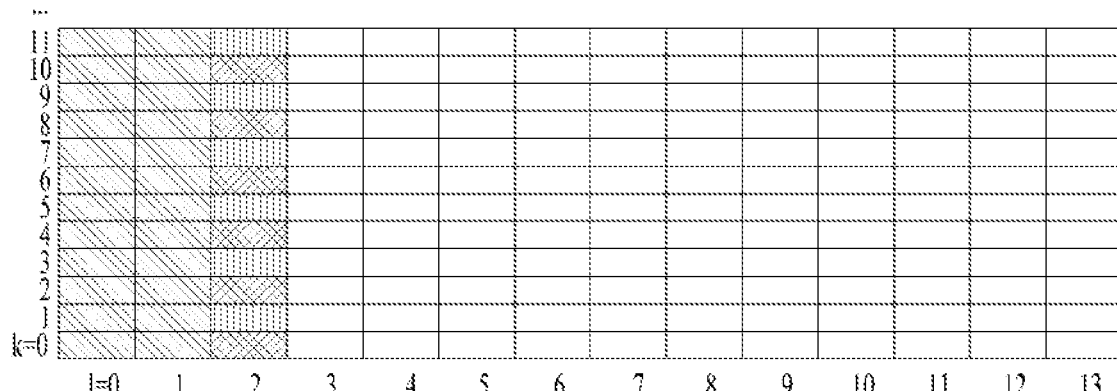
Figure 9:
Figure 9:
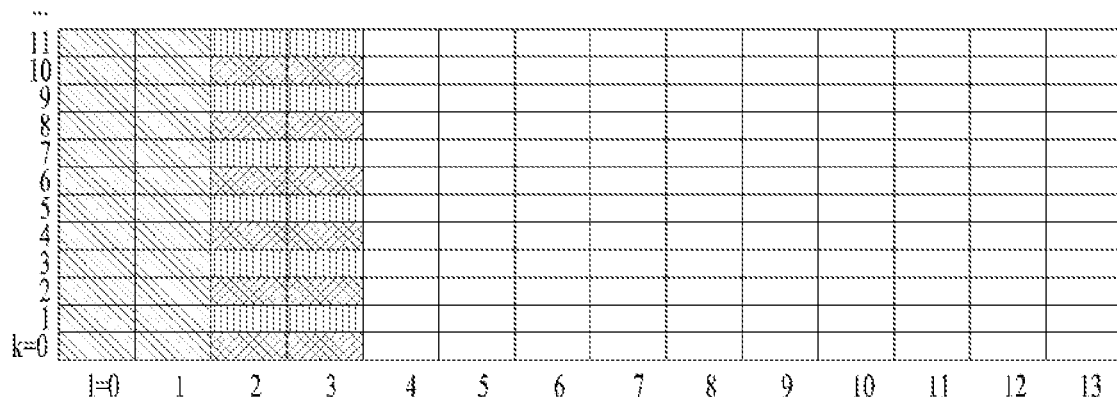

FIG. 9 is a diagram briefly illustrating an example for a front loaded DM-RS of a DM-RS configuration type 1 applicable to the present invention.

More specifically, FIG. 9 (*a*) illustrates a structure that a DM-RS is firstly loaded on one symbol (a front loaded DM-RS with one symbol) and FIG. 9 (*b*) illustrates a structure that a DM-RS is firstly loaded on two symbols (a front loaded DM-RS with two symbols).

In FIG. 9, Δ corresponds to a DM-RS offset value on a frequency axis. In this case, DM-RS ports having the same Δ can be CDM-F (code division multiplexing in frequency domain) or CDM-T (code division multiplexing in time domain). And, DM-RS ports having a different Δ can be CDM-F.

A user equipment can obtain information on a DM-RS port configuration configured by a base station via DCI.

1.7. DM-RS Port Group

In the present invention, a DM-RS port group may correspond to a set of DM-RSs having a QCL (Quasi co-located) relationship or partial QCL relationship. In this case, the QCL relationship means that channel environment such as Doppler spread and/or Doppler shift is the same. The partial QCL relationship means that partial channel environment is the same.

Figure 10:
FIG. 10 is a diagram illustrating an example of configuring a full-coherent precoding matrix according to an embodiment of the present invention.
Figure 10:
Figure 10:

FIG. 10 is a diagram briefly illustrating an operation that a user equipment transceives a signal with a single base station using two DM-RS port groups.

As shown in FIG. 10, a user equipment (UE) can include two panels. In this case, a single base station (e.g., TRP (Transmission Reception Point), etc.) can be connected with the UE through two beams. In this case, each of the beams may correspond to a single DM-RS port group. This is because DM-RS ports defined for a different panel may not be QCLed in the aspect of Doppler spread and/or Doppler shift.

Or, according to a different embodiment, a single DM-RS port group can be configured by a plurality of panels of a UE.

When DCI is defined according to a DM-RS port group, a UE can transmit a different CW (Codeword) according to a DM-RS port group. In this case, a single DM-RS port group can transmit one or two CWs. More specifically, when the number of layers corresponding to a DM-RS port group is equal to or less than 4, the DM-RS port group can transmit one CW. When the number of layers corresponding to a DM-RS port group is equal to or greater than 5, the DM-RS port group can transmit two CWs. And, DM-RS port groups different from each other may have a different scheduled BW.

When single DCI is defined for all DM-RS port groups participating in UL transmission, the DM-RS port groups can transmit one or two CWs. For example, when the total number of layers transmitted in two DM-RS port groups is equal to or less than 4, one CW is transmitted. On the other hand, when the total number of layers is equal to or greater than 5, two CWs can be transmitted.

According to the present invention, the number of UL DM-RS port groups can be set to a UE via SRI (SRS Resource Indication). For example, when the SRI sets two beams to a UE, the UE and a base station may regard it as two DM-RS port groups are set to the UE. According to an example of the present invention, the abovementioned configuration can be applied to a codebook-based UL transmission only.

Or, according to the present invention, the number of UL DM-RS port groups can be set to a UE through the number of SRS resource sets. For example, when a plurality of SRIs belonging to two different SRS resource sets are set to a UE, the UE and a base station may regard it as two DM-RS port groups are set to the UE. According to an example of the present invention, the abovementioned configuration can be applied to a non-codebook-based UL transmission only.

1.8. DCI Format in NR System

In NR system to which the present invention is applicable, it is able to support DCI formats described in the following. The NR system can support a DCI format 0_0 and a DCI format 0_1 as a DCI format for scheduling PUSCH and support a DCI format 1_0 and a DCI format 1_1 as a DCI format for scheduling PDSCH. And, the NR system can additionally support a DCI format 2_0, a DCI format 2_1, a DCI format 2_2, and a DCI format 2_3 as DCI formats capable of being utilized for other purposes.

In this case, the DCI format 0_0 is used for scheduling TB (Transmission Block)-based (or TB-level) PUSCH and the DCI format 0_1 can be used for scheduling TB (Transmission Block)-based (or TB-level) PUSCH or CBG-based (or CBG-level) PUSCH (when CBG (Code Block Group)-based signal transmission/reception is configured).

And, the DCI format 1_0 is used for scheduling TB-based (or TB-level) PDSCH and the DCI format 1_1 can be used for scheduling TB-based (or TB-level) PDSCH or CBG-based (or CBG-level) PDSCH (when CBG-based signal transmission/reception is configured).

And, the DCI format 2_0 is used for indicating a slot format, the DCI format 2_1 is used for indicating a PRB and an OFDM symbol that a specific UE assumes no intended signal transmission, the DCI format 2_2 is used for transmitting TPC (Transmission Power Control) commands of PUCCH and PUSCH, and the DCI format 2_3 can be used for transmitting a TPC command group for transmitting an SRS transmitted by one or more UEs.

A specific characteristic of the DCI format can be supported by 3GPP TS 38.212 document. In particular, among the DCI format-related characteristics, apparent steps and parts, which are not explained, can be explained with reference to the document. And, all terminologies disclosed in the present specification can be explained by the standard document.

1.9. Transmission Schemes

The NR system to which the present invention is applicable supports two transmission schemes described in the following for PUSCH: codebook-based transmission and non-codebook-based transmission.

According to one embodiment to which the present invention is applicable, when txConfig in a higher layer parameter PUSCH-Config, which is transmitted via higher layer signaling (e.g., RRC signaling), is configured by 'codebook', a codebook-based transmission can be set to a UE. On the other hand, when the txConfig in the higher layer parameter PUSCH-Config is configured by 'noncodebook', a non-codebook-based transmission can be set to the UE. If the higher layer parameter txConfig is not configured, PUSCH transmission, which is triggered by a specific DCI format (e.g., DCI format 0_0, and the like defined in 3GPP TS 38.211), can be performed based on a single PUSCH antenna port.

In the following description, a rank has the same meaning as the number of layers. For convenience of explanation, in the following description, the related technical features are described based on the term 'the number of layers'.

1.9.1. Codebook-Based UL Transmission

When a UE performs coherent transmission via a different panel, beamforming accuracy can be deteriorated due to phase noise. In particular, when phase noise exists, a UE can perform non-coherent transmission via panels different from each other.

Prior to detail explanation on coherent transmission and non-coherent transmission, a basic signal operation configuration of the present invention is described in FIG. 16.

As shown in FIG. 16, a row (horizontal) direction of a precoding matrix corresponds to a specific (physical) antenna and a column (vertical) direction of a precoding matrix may correspond to a specific layer.

In this case, each antenna can be mapped to an RF chain by 1:1. In this case, the RF chain may correspond to a processing block where a single digital signal is converted into an analog signal.

In this case, coherent transmission may correspond to an operation that a layer (or data of a layer) performs transmission via all antennas.

More specifically, when a signal is transmitted based on a full-coherent precoding matrix, a signal transmitted via each antenna can be generated as follows on a baseband.

$$\underbrace{\frac{1}{4}\begin{bmatrix} 1 & 1 & 1 & 1 \\ 1 & -1 & 1 & -1 \\ j & j & -j & -j \\ j & -j & -j & -j \end{bmatrix}}_{Codebook} \underbrace{\begin{bmatrix} x_1 \\ x_2 \\ x_3 \\ x_4 \end{bmatrix}}_{data} = \underbrace{\frac{1}{4}\begin{bmatrix} x_1 + x_2 + x_3 + x_4 \\ x_1 - x_2 + x_3 - x_4 \\ jx_1 + jx_2 - jx_3 - jx_4 \\ jx_1 - jx_2 - jx_3 - jx_4 \end{bmatrix}}_{transmitted\ signal} \quad [\text{Equation 3}]$$

For example, according to the example above, ¼ ($X_1$+$X_2$+$X_3$+$X_4$) signal is generated for an antenna 1 and ¼ ($X_1$−$X_2$+$X_3$−$X_4$) signal can be generated for an antenna 2.

On the contrary, non-coherent transmission may correspond to an operation that a layer (or data of a layer) performs transmission via a specific antenna corresponding to the layer.

More specifically, when a signal is transmitted based on a non-coherent precoding matrix, a signal transmitted via each antenna can be generated as follows on a baseband.

$$\frac{1}{4}\underbrace{\begin{bmatrix} 1 & 0 & 0 & 0 \\ 0 & 1 & 0 & 0 \\ 0 & 0 & 1 & 0 \\ 0 & 0 & 0 & 1 \end{bmatrix}}_{Codebook}\underbrace{\begin{bmatrix} x_1 \\ x_2 \\ x_3 \\ x_4 \end{bmatrix}}_{data} = \frac{1}{4}\underbrace{\begin{bmatrix} x_1 \\ x_2 \\ x_3 \\ x_4 \end{bmatrix}}_{transmitted\ signal} \quad \text{[Equation 4]}$$

In this case, a signal is generated on a baseband due to a reason described in the following.

In the aforementioned antenna-RF chain configuration, an RF chain connected to each antenna corresponds to a combination of multiple RF elements. Each of the RF elements may generate unique distortion (e.g., phase shifting, amplitude attenuation).

In particular, when the distortion is insignificant, it may have no problem. However, if a value of the distortion is significant, it may affect beamforming.

For example, in an equation described in the following, a specific matrix (e.g., phase shifted matrix due to RF impairment) is additionally described to express contamination of a signal which has passed through an RF chain. In this case, if there is no distortion, the matrix becomes an identity matrix.

$$\frac{1}{4}\underbrace{\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{phase\ shift\ due\ to\ RF\ impairment}\underbrace{\begin{bmatrix} 1 & 1 & 1 & 1 \\ 1 & -1 & 1 & -1 \\ j & j & -j & -j \\ j & -j & -j & -j \end{bmatrix}}_{Codebook}\underbrace{\begin{bmatrix} x_1 \\ x_2 \\ x_3 \\ x_4 \end{bmatrix}}_{data} = \quad \text{[Equation 5]}$$

$$\frac{1}{4}\underbrace{\begin{bmatrix} e^{j\theta_1} & e^{j\theta_1} & e^{j\theta_1} & e^{j\theta_1} \\ e^{j\theta_2} & -e^{j\theta_2} & e^{j\theta_2} & -e^{j\theta_2} \\ je^{j\theta_3} & je^{j\theta_3} & -je^{j\theta_3} & -je^{j\theta_3} \\ je^{j\theta_4} & -je^{j\theta_4} & -je^{j\theta_4} & -je^{j\theta_4} \end{bmatrix}}_{Corrupted\ Codebook}\underbrace{\begin{bmatrix} x_1 \\ x_2 \\ x_3 \\ x_4 \end{bmatrix}}_{data}$$

In equation 5, it is necessary to transmit data such as $X_1$ in a vector direction such as [1 1 j j]. However, due to distortion generated by an RF chain, the data is transmitted in a direction of [$e^{j\theta_1}$ $e^{j\theta_2}$ $je^{j\theta_3}$ $je^{j\theta_4}$]. In particular, as values of $\theta_1$ $\theta_2$, $\theta_3$, $\theta_4$ are getting bigger, a signal transmission direction can be considerably changed from an original direction.

In this case, although distortions generated by 4 RF chains are big, if sizes of the distortions are all the same, no problem may occur. This is because, since [$e^{j\theta_1}$ $e^{j\theta_1}$ $je^{j\theta_1}$ $je^{j\theta_1}$]=$e^{j\theta_1}$ [1 1 j j], a beam direction is not changed irrespective of a size of $\theta_1$.

In particular, when the distortion of the RF chain is big, as illustrated in equation 6, it may be preferable not to perform beamforming (i.e., a non-coherent transmission scheme).

$$\frac{1}{4}\underbrace{\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{phase\ shift\ due\ to\ RF\ impairment}\underbrace{\begin{bmatrix} 1 & 0 & 0 & 0 \\ 0 & 1 & 0 & 0 \\ 0 & 0 & 1 & 0 \\ 0 & 0 & 0 & 1 \end{bmatrix}}_{Codebook}\underbrace{\begin{bmatrix} x_1 \\ x_2 \\ x_3 \\ x_4 \end{bmatrix}}_{data} = \quad \text{[Equation 6]}$$

$$\frac{1}{4}\underbrace{\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{Corrupted\ Codebook}\underbrace{\begin{bmatrix} x_1 \\ x_2 \\ x_3 \\ x_4 \end{bmatrix}}_{data}$$

Referring to equation 6, a codebook contaminated by distortion and a not contaminated codebook have such a difference as $e^{j\theta_1}$, $e^{j\theta_2}$, $e^{j\theta_3}$, $e^{j\theta_4}$ only in the aspect of data $X_1$. Consequently, the distortion can be corrected at the time of estimating a channel.

In particular, when distortion of an RF chain is not significant or distortions generated by all RF chains are the same, it may be preferable to transmit a signal using a full-coherent codebook capable of performing digital beamforming. Or, when each RF chain has a different distortion and a size of the distortion is big enough for affecting beamforming, it may be preferable to transmit a signal using a non-coherent codebook incapable of performing digital beamforming.

In addition, in case of a partial coherent codebook with rank 4 (or a partial coherent codebook for 4 layers), since characteristic of an RF chain connected with an antenna 1 is similar to characteristic of an RF chain connected with an antenna 3, it may consider that distortions generated by the RF chains are the same. The relationship above can be identically applied to an antenna 2 and an antenna 4 as well.

In particular, in case of the partial coherent codebook with rank 4 (or the partial coherent codebook for 4 layers) (e.g., TPMI index 1 or 2 in Table 13), a transmitter (e.g., UE) transmits a signal using a coherent transmission scheme for an antenna 1 & an antenna 3 (or an antenna 2 & an antenna 4) and can transmit a signal using a non-coherent scheme between the antenna 1 and the antenna 2. The abovementioned characteristic can be checked through TPMI indexes 4 to 11 of Table 9, TPMI indexes 6 to 13 of Table 11, and TPMI indexes 1 to 2 of Table 12.

On the other hand, when an MCS (Modulation and Coding Scheme) is low, an impact due to phase noise is not that big (i.e., marginal). In particular, the beamforming accuracy may not be considerably deteriorated (i.e., marginal). In this case, preferably, a UE can perform coherent combining.

Meanwhile, the impact due to the phase noise is different in relation to an RF (Radio Frequency). In particular, an expensive RF element may have very small phase noise.

In particular, the NR system applicable to the present invention can support both non-coherent transmission and coherent transmission.

In order to perform codebook-based transmission, a UE determines a codebook subset based on the reception of a TPMI (Transmitted Precoding Matrix Indicator) and codebookSubset included in higher layer signaling PUSCH-Config. In this case, the codebookSubset can be configured by one selected from the group consisting of 'fullAndPartialAndNonCoherent', 'partialAndNonCoherent', and 'non- Coherent' depending on UE capability indicating a codebook capable of being supported by the UE. In this case, the 'fullAndPartialAndNonCoherent' indicates that the UE is able to support a full-coherent codebook, a partial-coherent codebook, and a non-coherent codebook. The 'partialAndNonCoherent' indicates that the UE is able to support a partial-coherent codebook and a non-coherent codebook. The 'nonCoherent' indicates that the UE is able to support a non-coherent codebook only.

In this case, the maximum transmission rank (or the number of layers) applied to the codebook can be configured by maxrank included in the higher layer signaling PUSCH-Config.

Having reported 'partialAndNonCoherent' as UE capability of the UE, the UE does not expect that the codebook Subset is configured by the 'fullAndPartialAndNonCoherent'. This is because, as mentioned in the foregoing description, if the UE reports 'partialAndNonCoherent' as UE capability of the UE, it means that the UE does not support signal transmission based on a full coherent codebook. In particular, the UE may not expect a configuration (i.e., codebook subset is configured by 'fullAndPartialAndNonCoherent') for transmitting a signal based on the full coherent codebook.

Similarly, having reported 'nonCoherent' as UE capability of the UE, the UE does not expect that the codebook Subset is configured by the 'fullAndPartialAndNonCoherent' or the 'partialAndNonCoherent'.

The NR system to which the present invention is applicable supports two options using UL waveforms: one is CP-OFDM (Cyclic Prefix—Orthogonal Frequency Division Multiplexing) and another is DFT-s-OFDM (Discrete Fourier Transform—spread—Orthogonal Frequency Division Multiplexing). In this case, in order to generate the DFT-s-OFDM waveform, it is necessary to apply transform precoding.

When transform precoding is disabled for a UE according to the present invention or the UE is unable to apply the transform precoding, the UE uses the CP-OFDM waveform as an uplink waveform. On the contrary, when the transform precoding is abled for the UE or the UE is able to apply the transform precoding, the UE uses the DFT-s-OFDM waveform as an uplink waveform.

In the following description, when transform precoding is disabled for a specific UE or the specific UE is unable to apply the transform precoding, it is common referred to as a case that the transform precoding is disabled.

In this case, a precoder W, which is determined to perform codebook-based transmission, can be determined based on the number of transmission layers, the number of antenna ports, and a TPMI included in DCI for scheduling UL transmission according to a table described in the following.

Table 8 illustrates a precoding matrix W for performing single layer transmission using 2 antenna ports and Table 9 illustrates a precoding matrix W for performing single layer transmission using 4 antenna ports with transform precoding disabled.

TABLE 8

| TPMI index | W (ordered from left to right in increasing order of TPMI index) | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

TABLE 9

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

Table 10 illustrates a precoding matrix W for performing 2-layer transmission using 2 antenna ports with transform precoding disabled, Table 11 illustrates a precoding matrix W for performing 2-layer transmission using 4 antenna ports with transform precoding disabled, Table 12 illustrates a precoding matrix W for performing 3-layer transmission using 4 antenna ports with transform precoding disabled, and Table 13 illustrates a precoding matrix W for performing 4-layer transmission using 4 antenna ports with transform precoding disabled.

TABLE 10

| TPMI index | W (ordered from left to right in increasing order of TPMI index) |||
| --- | --- | --- | --- |
| 0-2 | $\frac{1}{\sqrt{2}}\begin{bmatrix}1 & 0\\ 0 & 1\end{bmatrix}$ | $\frac{1}{\sqrt{2}}\begin{bmatrix}1 & 1\\ 1 & -1\end{bmatrix}$ | $\frac{1}{2}\begin{bmatrix}1 & 1\\ j & -j\end{bmatrix}$ |

TABLE 11

| TPMI index | W (ordered from left to right in increasing order of TPMI index) |||||
| --- | --- | --- | --- | --- |
| 0-3 | $\frac{1}{2}\begin{bmatrix}1 & 0\\ 0 & 1\\ 0 & 0\\ 0 & 0\end{bmatrix}$ | $\frac{1}{2}\begin{bmatrix}1 & 0\\ 0 & 0\\ 0 & 1\\ 0 & 0\end{bmatrix}$ | $\frac{1}{2}\begin{bmatrix}1 & 0\\ 0 & 0\\ 0 & 0\\ 0 & 1\end{bmatrix}$ | $\frac{1}{2}\begin{bmatrix}0 & 0\\ 1 & 0\\ 0 & 1\\ 0 & 0\end{bmatrix}$ |
| 4-7 | $\frac{1}{2}\begin{bmatrix}0 & 0\\ 1 & 0\\ 0 & 0\\ 0 & 1\end{bmatrix}$ | $\frac{1}{2}\begin{bmatrix}0 & 0\\ 0 & 0\\ 1 & 0\\ 0 & 1\end{bmatrix}$ | $\frac{1}{2}\begin{bmatrix}1 & 0\\ 0 & 1\\ 1 & 0\\ 0 & -j\end{bmatrix}$ | $\frac{1}{2}\begin{bmatrix}1 & 0\\ 0 & 1\\ 1 & 0\\ 0 & j\end{bmatrix}$ |
| 8-11 | $\frac{1}{2}\begin{bmatrix}1 & 0\\ 0 & 1\\ -j & 0\\ 0 & 1\end{bmatrix}$ | $\frac{1}{2}\begin{bmatrix}1 & 0\\ 0 & 1\\ -j & 0\\ 0 & -1\end{bmatrix}$ | $\frac{1}{2}\begin{bmatrix}1 & 0\\ 0 & 1\\ -1 & 0\\ 0 & -j\end{bmatrix}$ | $\frac{1}{2}\begin{bmatrix}1 & 0\\ 0 & 1\\ -1 & 0\\ 0 & j\end{bmatrix}$ |
| 12-15 | $\frac{1}{2}\begin{bmatrix}1 & 0\\ 0 & 1\\ j & 0\\ 0 & 1\end{bmatrix}$ | $\frac{1}{2}\begin{bmatrix}1 & 0\\ 0 & 1\\ j & 0\\ 0 & -1\end{bmatrix}$ | $\frac{1}{2\sqrt{2}}\begin{bmatrix}1 & 1\\ 1 & 1\\ 1 & -1\\ 1 & -1\end{bmatrix}$ | $\frac{1}{2\sqrt{2}}\begin{bmatrix}1 & 1\\ 1 & 1\\ j & -j\\ j & -j\end{bmatrix}$ |
| 16-19 | $\frac{1}{2\sqrt{2}}\begin{bmatrix}1 & 1\\ j & j\\ 1 & -1\\ j & -j\end{bmatrix}$ | $\frac{1}{2\sqrt{2}}\begin{bmatrix}1 & 1\\ j & j\\ j & -j\\ -1 & 1\end{bmatrix}$ | $\frac{1}{2\sqrt{2}}\begin{bmatrix}1 & 1\\ -1 & -1\\ 1 & -1\\ -1 & 1\end{bmatrix}$ | $\frac{1}{2\sqrt{2}}\begin{bmatrix}1 & 1\\ -1 & -1\\ j & -j\\ -j & j\end{bmatrix}$ |
| 20-21 | $\frac{1}{2\sqrt{2}}\begin{bmatrix}1 & 1\\ -j & -j\\ 1 & -1\\ -j & j\end{bmatrix}$ | $\frac{1}{2\sqrt{2}}\begin{bmatrix}1 & 1\\ -j & -j\\ j & -j\\ 1 & -1\end{bmatrix}$ | — | — |

TABLE 12

| TPMI index | W (ordered from left to right in increasing order of TPMI index) |||||
| --- | --- | --- | --- | --- |
| 0-3 | $\frac{1}{2}\begin{bmatrix}1 & 0 & 0\\ 0 & 1 & 0\\ 0 & 0 & 1\\ 0 & 0 & 0\end{bmatrix}$ | $\frac{1}{2}\begin{bmatrix}1 & 0 & 0\\ 0 & 1 & 0\\ 1 & 0 & 0\\ 0 & 0 & 1\end{bmatrix}$ | $\frac{1}{2}\begin{bmatrix}1 & 0 & 0\\ 0 & 1 & 0\\ -1 & 0 & 0\\ 0 & 0 & 1\end{bmatrix}$ | $\frac{1}{2\sqrt{3}}\begin{bmatrix}1 & 1 & 1\\ 1 & -1 & 1\\ 1 & 1 & -1\\ 1 & -1 & -1\end{bmatrix}$ |
| 4-6 | $\frac{1}{2\sqrt{3}}\begin{bmatrix}1 & 1 & 1\\ 1 & -1 & 1\\ j & j & -j\\ j & -j & -j\end{bmatrix}$ | $\frac{1}{2\sqrt{3}}\begin{bmatrix}1 & 1 & 1\\ -1 & 1 & -1\\ 1 & 1 & -1\\ -1 & 1 & 1\end{bmatrix}$ | $\frac{1}{2\sqrt{3}}\begin{bmatrix}1 & 1 & 1\\ -1 & 1 & -1\\ j & j & -j\\ -j & j & j\end{bmatrix}$ | — |

TABLE 13

| TPMI index | W ordered from left to right in increasing order of TPMI index | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

1.9.2. Non-Codebook-Based UL Transmission

When a plurality of SRS resources are configured to perform non-codebook-based transmission, a UE can determine a PUSCH precoder and a transmission rank (or the number of layers) based on a (wideband) SRI (Sounding reference signal Resource Indicator). In this case, the SRI can be provided via DCI or higher layer signaling.

In this case, the determined precoder may correspond to an identity matrix.

2. Proposed Embodiment

In the following, a configuration proposed in the present invention is explained in more detail based on the aforementioned technological idea.

In the present invention, a precoder or a precoding matrix corresponds to a transmission matrix used by a UE to transmit a UL PT-RS.

In the present invention, UL PT-RS power boosting corresponds to an operation of a UE that increases transmit power of a UL PT-RS port compared to transmit power of PUSCH for a single layer. In particular, a UL PT-RS power boosting level can indicate a level of transmit power of a UL PT-RS port compared to transmit power of PUSCH for a single layer.

In other word, according to the present invention, a UL PT-RS power boosting level of a specific PT-RS port may correspond to a value indicating a level of transmit power of the PT-RS port which is boosted on the basis of a PUSCH layer connected (or related) with the PT-RS port. Or, according to the present invention, a UL PT-RS power boosting level of a specific PT-RS port may correspond to a value indicating a level of transmit power of a PT-RS, which is transmitted in the specific PT-RS port, on the basis of PUSCH transmit power in a layer connected (or related) with the PT-RS port.

In the present invention, UL PT-RS power boosting can include power boosting (or power sharing) according to multiple PT-RS ports and/or power boosting (or power sharing) according to multiple layers.

First of all, the power boosting according to multiple PT-RS ports can be applied when two PT-RS ports are set to a UE. More specifically, when a first PT-RS port and a second PT-RS port (i.e., the number of PT-RS ports is 2) are set to a UE, the UE borrows power from a resource element in which the second PT-RS port (or the first PT-RS port) is transmitted to transmit a PT-RS by boosting power of the first PT-RS port (or the second PT-RS port).

In this case, each PT-RS port set to the UE can be assigned to a different subcarrier to which a related (or corresponding) DM-RS port is assigned. In particular, PT-RSs respectively corresponding to the two PT-RS ports can be assigned to a different subcarrier, i.e., a different resource element.

In the following description, such an expression as 'correspond to' can be replaced with such an expression as 'related to' or 'associated with'.

The power boosting according to multiple layers can be applied when a plurality of layers are configured in association with a single PT-RS port. More specifically, when two layers associated with a single PT-RS port are set to a UE, the UE can transmit a PT-RS via power boosting between the layers through the single PT-RS port (or using the single PT-RS port).

In addition, it may consider a method of borrowing power from a different antenna port (e.g., CSI-RS, etc.) not used for PT-RS power boosting. To this end, it is necessary to have a power amplifier having a more dynamic range. In particular, it may have a problem that UE implementation cost increases.

In the present invention, a configuration of applying power boosting (or power sharing) according to multiple PT-RS ports and/or power boosting (or power sharing) according to multiple layers is explained in detail as a UL PT-RS port power boosting method.

In the following, a PT-RS power boosting method for performing codebook-based UL transmission or non-codebook-based UL transmission and a method of transmitting a PT-RS based on the PT-RS power boosting method are explained in detail based on the aforementioned technological idea.

According to the present invention, a UE can report UE capability indicating that the UE is able to support Full-coherent, Partial-coherent, or non-coherent to a base station. In this case, when the UE is able to support the Full-coherent, it means that the UE is able to transmit a PT-RS based on a Full-coherent precoding matrix, a Partial-coherent precoding matrix, and a non-coherent precoding matrix. Similarly, when the UE is able to support the Partial-coherent, it means that the UE is able to transmit a PT-RS based on a Partial-coherent precoding matrix and a non-coherent precoding matrix. When the UE is able to support the non-coherent, it means that the UE is able to transmit a PT-RS based on a non-coherent precoding matrix only.

Subsequently, the base station can provide the UE with information on a precoding matrix (e.g., TPMI (Transmitted Precoding Matrix Indicator) and a TRI (Transmission Rank Indicator). Specifically, the base station can provide the UE with the information (e.g., TPMI and TM) on the precoding matrix via DCI (Downlink Control Information). Or, the base station can provide the UE with information indicating the information (e.g., TPMI and TM) on the precoding matrix via higher layer signaling (e.g., RRC signaling).

When the UE reports that the UE is able to support the Full-coherent to the base station, the base station can transmit information (e.g., TPMI, TRI, etc.) on a precoding matrix selected from among the Full-coherent precoding matrix, the Partial-coherent precoding matrix, and the non-coherent precoding matrix to the UE.

When the UE reports that the UE is able to support the Partial-coherent to the base station, the base station can transmit information (e.g., TPMI, TM, etc.) on a precoding matrix selected from among the Partial-coherent precoding matrix and the non-coherent precoding matrix to the UE.

When the UE reports that the UE is able to support the non-coherent to the base station, the base station can transmit information (e.g., TPMI, TRI, etc.) on a non-coherent precoding matrix to the UE.

The information on the precoding matrix may correspond to information on a precoding matrix among precoding matrixes illustrated in Tables 9 to 14 (or information indicating a precoding matrix among the precoding matrixes). In this case, a full coherent precoding matrix corresponds to a matrix that all element values of the matrix are not 0. A non-coherent precoding matrix corresponds to a matrix that the maximum number of elements of which a value is not 0 in each row corresponds to 1 and the number of elements of which a value is not 0 in each column corresponds to 1. A partial-coherent precoding matrix corresponds to a matrix neither the full coherent matrix nor the non-coherent matrix.

The UE determines an uplink PT-RS power boosting level based on a precoding matrix configured by the base station and can transmit the PT-RS based on the determined uplink PT-RS power boosting level. More specifically, the UE can transmit the PT-RS based on the uplink PT-RS power boosting level which is determined via a related (corresponding) UL layer according to a configured PT-RS port.

In the following, a method of determining a PT-RS power boosting level based on a configured precoding matrix is explained in detail.

In Case of Full-Coherent Precoding Matrix

FIG. 10 is a diagram illustrating an example of configuring a full-coherent precoding matrix according to an embodiment of the present invention.

As mentioned in the foregoing description, a Full-coherent precoding matrix may correspond to a matrix that all element values of the matrix are not 0.

When a UE reports UE capability indicating that the UE is able to support the Full-coherent precoding matrix, the UE may expect that the number of PT-RS ports corresponds to 1. In particular, in the present invention, when the Full-coherent precoding matrix is configured, only one PT-RS port can be set to the UE.

In this case, an uplink PT-RS power boosting factor or a power boosting level can satisfy the following equation.

$$10 \times \log_{10}(X) \qquad \text{[Equation 7]}$$

In this case, X may correspond to the number of (PUSCH) layers configured in association with a single PT-RS port.

For example, as shown in FIG. 10, when a precoding matrix corresponding to a TPMI index 4 of Table 13 is set to a UE and a UL PT-RS port is associated with a layer #0, it may assume that a precoder of the PT-RS port corresponds to a precoding matrix corresponding to a TPMI index 13 of Table 9. In this case, information indicating that the UL PT-RS port is associated with the layer #0 can be forwarded to the UE via DCI or RRC signaling. In other word, the UL PT-RS port can be associated with a layer #1, a layer #2, or a layer #3 rather than the layer #0 depending on an embodiment and information can be forwarded to the UE via DCI or RRC signaling.

Since the UE is able to borrow power from other 3 layers, the UE is able to configure EPRE (Energy Per Resource Element) compared to PUSCH by 6 dB while keeping per antenna power constraint.

In Case of Partial-Coherent Precoding Matrix

Figure 11:
FIG. 11 is a diagram illustrating an example of configuring a partial-coherent precoding matrix according to a different embodiment of the present invention.
Figure 11:
Figure 11:
Figure 11:

FIG. 11 is a diagram illustrating an example of configuring a partial-coherent precoding matrix according to a different embodiment of the present invention.

In case of a partial-coherent precoding matrix, each layer can be transmitted at one or two antenna ports.

In case of a precoding matrix of maximum rank 3, antenna port(s) transmitting each layer are not overlapped. In particular, each layer is transmitted at a different antenna port(s).

On the other hand, in case of a precoding matrix of a rank 4, each layer is transmitted at two antenna ports and a pair of layers is transmitted at an antenna port belonging to the same set.

In particular, when a single PT-RS port is set, if a precoding matrix of the maximum rank 3 is set to a UE, the UE is unable to perform UL PT-RS power boosting. On the contrary, if a precoding matrix of a rank 4 is set to a UE, the UE can perform UL PT-RS power boosting as much as 3 dB with the help of antenna ports overlapped according to a layer.

As a different example, when two PT-RS ports are set to a UE, if power is borrowed from REs muted in frequency domain, a UE to which a precoding matrix of maximum rank 3 is set is able to perform UL PT-RS power boosting as much as 3 dB and a UE to which a precoding matrix of rank 4 is set is able to perform UL PT-RS power boosting as much as 6 dB.

In this case, an uplink PT-RS power boosting factor or a power boosting level can satisfy the following equation.

First of all, a UE to which a partial-coherent precoding matrix of rank 1, rank 2, or rank 3 is set can perform UL PT-RS power boosting satisfying the following equation.

$$10 \times \log_{10}(Y) \qquad \text{[Equation 8]}$$

In this case, Y corresponds to the number of UL PT-RS ports set to the UE and may have a value of 1 or 2.

Or, a UE to which a partial-coherent precoding matrix of rank 4 is set can perform UL PT-RS power boosting satisfying the following equation.

$$10 \times \log_{10}(YZ) \qquad \text{[Equation 9]}$$

In this case, Y corresponds to the number of UL PT-RS ports set to the UE and may have a value of 1 or 2. And, Z corresponds to the number of PUSCH layers sharing the same UL PT-RS port.

For example, as shown in FIG. 11, when a precoding matrix corresponding to a TPMI index 2 of Table 13 is set to a UE and a UL PT-RS port is associated with a layer #0, it may assume that a precoder of the PT-RS port corresponds to a precoding matrix corresponding to a TPMI index 2 of Table 9. In this case, as mentioned in the foregoing description, information indicating that the UL PT-RS port is associated with the layer #0 can be forwarded to the UE via DCI or RRC signaling. In other word, the UL PT-RS port can be associated with a layer #1 rather than the layer #0 depending on an embodiment and information can be forwarded to the UE via DCI or RRC signaling.

Since the UE is able to borrow power from a different PT-RS port, the UE is able to configure EPRE (Energy Per Resource Element) compared to PUSCH (PUSCH to PT-RS EPRE) by 3 dB while keeping per antenna power constraint.

On the other hand, when a precoding matrix corresponding to a TPMI index 2 of Table 12 is set to a UE and a UL PT-RS port is associated with a layer #0, it may assume that a precoder of the PT-RS port corresponds to a precoding matrix corresponding to a TPMI index 2 of Table 11.

In this case, in order to keep per antenna power constraint, PUSCH to PT-RS EPRE should be 0 dB.

Additionally, when two UL PT-RS ports are set to the UE, it may configure an additional UL PT-RS port. The additional UL PT-RS port can be associated with a later #2 or a layer #3 via DCI or RRC signaling.

In Case of Non-Coherent Precoding Matrix

Figure 12:
FIG. 12 is a diagram illustrating an example of configuring a non-coherent precoding matrix according to a further different embodiment of the present invention.
Figure 12:
Figure 12:
Figure 12:

FIG. 12 is a diagram illustrating an example of configuring a non-coherent precoding matrix according to a further different embodiment of the present invention.

In case of a non-coherent precoding matrix, each layer can be transmitted at one antenna port. In this case, in order to keep per antenna power constraint, a PT-RS port is unable to borrow power from a different layer.

On the other hand, when two PT-RS ports are configured, a specific PT-RS port may borrow power as much as 3 dB from REs muted in frequency domain (for another PT-RS port).

In this case, as shown in equation 8, an uplink PT-RS power boosting factor or a power boosting level can satisfy $10 \times \log_{10}(Y)$. In this case, Y corresponds to the number of UL PT-RS ports set to the UE and may have a value of 1 or 2.

For example, as shown in FIG. 12, when a precoding matrix corresponding to a TPMI index 0 of Table 13 is set to a UE and a UL PT-RS port is associated with a layer #0, it may assume that a precoder of the PT-RS port corresponds to a precoding matrix corresponding to a TPMI index 0 of Table 9. In this case, as mentioned in the foregoing description, information indicating that the UL PT-RS port is associated with the layer #0 can be forwarded to the UE via DCI or RRC signaling. In other word, the UL PT-RS port can be associated with a layer #1 rather than the layer #0 depending on an embodiment and information can be forwarded to the UE via DCI or RRC signaling.

In this case, in order to keep per antenna power constraint, PUSCH to PT-RS EPRE should be 0 dB.

In the following, when transform precoding is disabled according to the present invention, all embodiments capable of being applied to a method for a UE to perform UL PT-RS power boosting and a method of transmitting a UL PT-RS based on the power boosting method are explained in detail.

Figure 17:
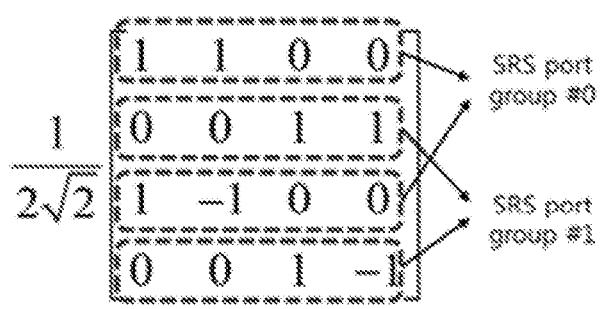
FIG. 17 illustrates an example configuration of SRS ports.

In the following description, assume that SRS (Sounding Reference Signal) ports 0 and 2 within an indicated TPMI share a PT-RS port 0 and SRS ports 1 and 3 within an indicated TPMI share a PT-RS port 1. In particular, as described in FIG. 17, assume that an SRS port group #0 (e.g., SRS ports 0 and 2) shares a PT-RS port and an SRS port group #1 (e.g., SRS ports 1 and 3) shares a different PT-RS port.

First of all, when a configured precoding matrix corresponds to a precoding matrix of a rank 2, a UE can determine a UL PT-RS power boosting level as follows. In the following, a method for a UE to determine a UL PT-RS power boosting level is explained in detail based on 4 rank-2 precoding matrixes described in the following.

$$A = \frac{1}{2}\begin{bmatrix} 1 & 0 \\ 0 & 1 \\ 0 & 0 \\ 0 & 0 \end{bmatrix}, B = \frac{1}{2}\begin{bmatrix} 1 & 0 \\ 0 & 0 \\ 0 & 1 \\ 0 & 0 \end{bmatrix}, C = \frac{1}{2}\begin{bmatrix} 1 & 0 \\ 0 & 1 \\ -1 & 0 \\ 0 & -j \end{bmatrix}, D = \frac{1}{2\sqrt{2}}\begin{bmatrix} 1 & 1 \\ -j & -j \\ j & -j \\ 1 & -1 \end{bmatrix}$$

For example, when a PT-RS port is assigned (set) to a UE, the UE does not perform power boosting based on a precoding matrix corresponding to A or B.

In this case, in order for the UE to perform PT-RS power boosting, the UE should borrow power from a different antenna port (e.g., CSI-RS port, etc.) which is not used. However, since the operation above requires a power amplifier having a more dynamic range, it is not preferable in terms of UE implementation.

In particular, in case of the matrix B, since two layers share the same UL PT-RS port, it may define a single PT-RS port only for the matrix B.

On the other hand, in case of the matrix A, since two layers share a different UL PT-RS port, it may define one or two PT-RS ports for the matrix A. In particular, when two PT-RS ports are defined for the matrix A, a UE can borrow power from an RE in which a different PT-RS port is transmitted. Hence, when two PT-RS ports are defined for the matrix A, the UE is able to perform power boosting on each of the two PT-RS ports.

Similar to the matrix B, it may be able to define one or two PT-RS ports for the matrix C. In particular, when one PT-RS port is set to the matrix C, a UE is able to perform 0 dB power boosting. When two PT-RS ports are set to the matrix C, the UE is able to perform 3 dB power boosting.

The matrix D corresponds to a full-coherent matrix. It may define a single PT-RS port only for the matrix D. In particular, in case of the matrix D, the UE is able to perform 3 dB power boosting.

When a configured precoding matrix corresponds to a rank 3 precoding matrix, a UE can determine a UL PT-RS power boosting level as follows. In the following, a method for a UE to determine a UL PT-RS power boosting level based on two rank 3 precoding matrixes is explained.

$$A = \frac{1}{2}\begin{bmatrix} 1 & 0 & 0 \\ 0 & 1 & 0 \\ 1 & 0 & 0 \\ 0 & 0 & 1 \end{bmatrix}, B = \frac{1}{2\sqrt{3}}\begin{bmatrix} 1 & 1 & 1 \\ -1 & 1 & -1 \\ j & j & -j \\ -j & j & j \end{bmatrix}$$

When a PT-RS port is assigned (set) to the matrix A, since a UE is unable to borrow power from layers assigned by the same PT-RS port due to the reason identical to the reason of the matrix A or B of rank 2, the UE is unable to perform power boosting (in other word, the UE is able to perform 0 dB power boosting).

The matrix B corresponds to a full-coherent matrix and it may be able to define a single PT-RS port only for the matrix B. In particular, in case of the matrix B, a UE is able to perform 4.77 dB power boosting.

Subsequently, when a configured precoding matrix corresponds to a precoding matrix of rank 4, a UE can determine a UL PT-RS power boosting level as follows. In the following, a method for a UE to determine a UL PT-RS power boosting level is explained in detail based on 1 rank-4 precoding matrix described in the following.

$$\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$$

The precoding matrix corresponds to a partial coherent matrix and shows a configuration that two layers are assigned (shared) to a PT-RS port. In particular, when the number of PT-RS ports corresponds to 1, the UE is able to perform 3 dB power boosting. When the number of PT-RS ports corresponds to 2, since the UE is able to borrow power from a different PT-RS port, the UE is able to perform 6 dB power boosting.

The aforementioned method for the UE to determine a UL PT-RS power boosting level can be determined as follows based on the number of UL PT-RS ports and the number of PUSCH layers sharing the same combination of active SRS ports.

In this case, the UL PT-RS power boosting level ($A$ [dB]) of the UE can satisfy the following equation. In this case, B of the equation 10 can be determined based on an RRC parameter and the number of PUSCH layers sharing the same combination of active SRS ports on the basis of the table described in the following.

$A = 10 * \log_{10}(\text{\# of UL PT-RS ports}) + B$  [Equation 10]

TABLE 14

|  |  | The number of PUSCH layers sharing the same combination of active SRS ports | | | |
|---|---|---|---|---|---|
|  |  | 1 | 2 | 3 | 4 |
| RRC parameters | 00 | 0 [dB] | 3 [dB] | 4.77 [dB] | 6 [dB] |
|  | 01 |  | reserved |  |  |
|  | 10 |  | reserved |  |  |
|  | 11 |  | reserved |  |  |

In this case, regarding RRC parameters '01', '10', and '11', it may be able to define B values different from an RRC parameter '00' of Table 14.

According to the present invention, when a separate RRC parameter is not set to a UE, the UE may use RRC parameters=00 as a default value. In other word, when a separate RRC parameter is not set to a UE, the UE may expect (or assume, or consider) that a value of B for determining a UL PT-RS power boosting level corresponds to 0 [dB] (when the number of PUSCH layers sharing the same combination of active SRS ports corresponds to 1), 3 [dB] (when the number of PUSCH layers sharing the same combination of active SRS ports corresponds to 2), 4.77 [dB] (when the number of PUSCH layers sharing the same combination of active SRS ports 3), or 6 [dB] (when the number of PUSCH layers sharing the same combination of active SRS ports corresponds to 4).

In addition, in case of a partial-coherent precoding matrix or a non-coherent precoding matrix, the aforementioned UL PT-RS power boosting level of the UE can be determined as follows.

First of all, when the partial-coherent precoding matrix or the non-coherent precoding matrix is applied, the PT-RS power boosting level of the UE can be determined based on the number of UL PT-RS ports only. However, as an exceptional case, since two layers are shared by a single PT-RS port for two partial-coherent precoding matrixes described in the following, it may additionally apply 3 dB to the PT-RS power boosting level of the UE.

$$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix} \quad \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$$

More specifically, among precoding matrixes except a full-coherent matrix, only the two partial-coherent matrixes can borrow power from a layer using the same combination of active SRS ports (or the same PT-RS port). In particular, although the two precoding matrixes correspond to partial-coherent precoding matrixes, a layer #0 and a layer #1 of the two precoding matrixes share the same SRS port. Similarly, a layer #2 and a layer #3 of the two precoding matrixes share the same SRS port. Hence, in case of the two precoding matrixes, it may borrow power between layers.

In particular, the UL PT-RS power boosting level ($A$ [dB]) of the UE satisfies the equation in the following. In case of a non-coherent precoding matrix, the B corresponds to 0. In case of a partial-coherent precoding matrix except the two precoding matrixes, the B corresponds to 0. In case of the two precoding matrixes, the B corresponds to 3 [dB].

$A = 10 * \log_{10}(\text{\# of UL PT-RS ports}) + B$  [Equation 11]

In this case, the UL PT-RS power boosting level satisfying the equation 11 may correspond to a PT-RS scaling factor $\beta$.

More specifically, when transform precoding is disabled, if a higher layer parameter UL-PTRS-present is set to a UE, the PT-RS scaling factor $\beta$ can be determines as follows based on a value indicated by an RRC parameter UL-PTRS-EPRE-ratio of which a default value corresponds to 00.

When a precoding matrix indicated by a TPMI corresponds to a precoding matrix corresponding to one selected from the group consisting of a TPMI index 0 of Table 10, TPMI indexes 0 to 13 of Table 11, TPMI indexes 0 to 2 of table 12, and a TPMI index 0 of table 13, the PT-RS scaling factor $\beta$ corresponds to $\sqrt{\text{PT-RS}^{UL}}$. In this case, $N_{PT-RS}^{UL}$ corresponds to the actual number of UL PT-RS ports.

When a precoding matrix indicated by a TPMI corresponds to a precoding matrix corresponding to one selected from among a TPMI index 1 of table 13 and a TPMI index 2 of table 13, the PT-RS scaling factor $\beta$ corresponds to $\sqrt{2N_{PT-RS}^{UL}}$.

Otherwise, the PT-RS scaling factor $\beta$ corresponds to 1.

TABLE 15

|  |  | The number of PUSCH layers | | | |
|---|---|---|---|---|---|
|  |  | 1 | 2 | 3 | 4 |
| UL-PTRS-EPRE-ratio | 00 | 1 | $\sqrt{2}$ | $\sqrt{3}$ | 2 |
|  | 01 |  | reserved |  |  |
|  | 10 |  | reserved |  |  |
|  | 11 |  | reserved |  |  |

Or, in case of a non-coherent codebook-based UL transmission or a partial coherent codebook-based UL transmission, the PT-RS scaling factor $\beta$ according to the base station can be determined as follows.

When a precoding matrix indicated by a TPMI corresponds to a precoding matrix corresponding to one selected from the group consisting of a TPMI index 0 of Table 10, TPMI indexes 0 to 13 of Table 11, TPMI indexes 0 to 2 of table 12, and a TPMI index 0 of table 13, the PT-RS scaling factor β corresponds to $\sqrt{\eta_1 N_{PT-RS}^{UL}}$. In this case, $N_{PT-RS}^{UL}$ corresponds to the actual number of UL PT-RS ports.

When a precoding matrix indicated by a TPMI corresponds to a precoding matrix corresponding to one selected from among a TPMI index 1 of table 17 and a TPMI index 2 of table 13, the PT-RS scaling factor β corresponds to $\sqrt{\eta_2 N_{PT-RS}^{UL}}$.

In this case, when RRC configuration does not exist or is not received, $\eta_1$ and $\eta_2$ can be configured by default values (i.e., 1 and 2), respectively. And, the $\eta_1$ and the $\eta_2$ can be reconfigured via RRC signaling.

In the aforementioned configuration, when partial-coherent codebook-based UL transmission or non-coherent codebook-based UL transmission is performed, if the number of PT-RS ports is configured by 2 (e.g., when the number of higher layer parameters UL-PT-RS-ports corresponds to 2), the actual number of UL PTRS port(s) is derived from an indicated precoding matrix (or TPMI) and a transmission layer(s) associated with each UL PT-RS port(s) can be determined according to the rules described in the following.

1> SRS ports #0 and #2 (or, DMRS ports #0 and #2) within an indicated precoding matrix (or TPMI) share a PTRS port #0.

2> SRS ports #1 and #3 (or, DMRS ports #1 and #3) within an indicated precoding matrix (or TPMI) share a PTRS port #1.

3> UL PTRS port #0 is associated with a UL layer x among layers transmitted via SRS ports #0 and #2 (or DMRS ports #0 and #2) within an indicated precoding matrix (or TPMI).

4> UL PTRS port #1 is associated with a UL layer y among layers transmitted via SRS ports #1 and #3 (or DMRS ports #1 and #3) within an indicated precoding matrix (or TPMI).

5> In this case, the x and the y are provided to a UE via an indicator of maximum 2 bits within a UL grant. In this case, the first bit of the indicator is used for indicating the x and the second bit of the indicator is used for indicating the y. For example, the x and/or the y can be provided via a DCI parameter 'PTRS-DMRS association' of a DCI format 0_1.

In addition, a UE according to the present invention can perform a PT-RS power boosting method to perform non-codebook based UL transmission.

More specifically, unlike codebook based UL transmission, in case of performing the non-codebook based UL transmission, a base station can inform a UE of an SRS port configuration between layers. In case of performing the non-codebook based UL transmission, a PT-RS power boosting level of a UE can be determined in a manner of being identical to the case of the aforementioned non-coherent precoding matrix (i.e., based on the number of UL PT-RS ports only).

Additionally, in relation to the aforementioned UE capability report of a UE, the UE according to the present invention can perform PT-RS power boosting as follows.

For example, when the UE reports non-coherent as the UE capability, it means that the UE does not share power between transmission antennas. In particular, when the UE reports non-coherent as the UE capability, although the UE is able to perform power boosting according to multiple PT-RS ports via non-codebook based UL transmission, the UE is unable to perform power boosting based on multiple layers.

Meanwhile, in case of performing the non-codebook based UL transmission, since a PT-RS port index is defined in every SRS resource, a UE is able to know the number of PT-RS ports defined in an SRS resource. Hence, the UE is able to accurately perform power boosting according to multiple PT-RS ports.

As a different example, when the UE reports full-coherent as the UE capability, it means that the UE is able to share power between transmission antennas. In this case, as mentioned in the foregoing description, a single PT-RS port can be set to the UE and the UE can perform power sharing on all antenna ports. In other word, having reported the full-coherent as the UE capability, the UE can perform power sharing on all SRS resources (ports) and power boosting based on the resources when the UE transmits a PT-RS via non-codebook based UL transmission.

As a further different example, when the UE reports partial-coherent as the UE capability, it means that the UE is able to share power between partial transmission antennas only.

Meanwhile, it is necessary for a base station to know SRS resources connected with antenna ports on which power sharing is performed. Hence, the UE can report the information to the base station in the aspect of the UE capability.

Otherwise, similar to the non-coherent case, the UE may assume that power sharing is not performed between antenna ports. In this case, the UE can perform power boosting only based on the number of multiple UL PT-RS ports.

Additionally, values corresponding to RRC parameters '01', '10', '11' included in before-mentioned Table 14 and Table 15 are configured by additionally applying below embodiments.

Additionally, PUSCH to PTRS power ratio per layer per RE, for codebook-based UL transmission, may be defined like below equation.

$$-A-10*\text{Log }10(N_{PT-RS})[\text{dB}] \quad \text{[Equation 12]}$$

In this equation, A is determined by below table, and $N_{PT-RS}$ denotes a number of PT-RS ports configured to the UE.

TABLE 16

| A [dB] | | # of PDSCH layers within SRS port group | | | | | |
|---|---|---|---|---|---|---|---|
| | | 1 | 2 | 3 | 4 | 5 | 6 |
| RRC parameter | 00 | 0 | 3 | 4.77 | 6 | 7 | 7.78 |
| | 01 | 0 | 0 | 0 | 0 | 0 | 0 |
| | 10 | | | reserved | | | |
| | 11 | | | reserved | | | |

Herein, a SRS port group means a group of SRS ports sharing identical PT-RS port.

In case of Full-coherent, only one SRS port group may be defined. In this case, all antenna ports of the UE is able to share power with other antenna ports.

In case of Partial-coherent, it may be able to define two SRS port groups. In this case, antenna ports belonging to the same group can perform power sharing only.

In case of Non-coherent, all antenna ports of the UE are unable to perform power sharing.

Consequently, according to the example, the UE is able to transmit PT-RS by power boosting as many as the number of layers defined in the same SRS port group.

For example, it is assumed that a UE reports partial-coherent to a base station. In this case, the UE and the base station may interpret a codeword (or precoding matrix) described in FIG. 18 as two SRS port groups. In this case, layer #0 and #1 are connected with an SRS port #0 only, and layers #2 and #3 are connected with an SRS port #1 only. Therefore, if a PT-RS port #0 is connected with the layer #0, when the UE transmits the PT-RS via layer #0, the UE is able to borrow power from the layer #1. But, when the UE transmits the PT-RS via layer #0, the UE is unable to borrow power from the layer #2 and #3 belonging to a different SRS port group.

Meanwhile, when a UE reports full-coherent, the UE may assume that all antenna ports are able to perform power sharing despite of the codeword (or precoding matrix).

Based on UE capability on full/partial/non coherent and/or configured TPMI (or codeword) form, the UE may determine UL PT-RS power boosting level.

Or, based on UE capability on full/partial/non coherent and/or configured TPMI (or codeword) form, the UE may determine default value related to UL PT-RS power boosting.

For example, when a UE reports that the UE supports full-coherent, the UE is able to share power between all antenna ports. And one PT-RS is defined only. In this case, UE and/or gNB assume $00^{th}$ row of Table 16 as default.

For another example, when a UE reports that the UE supports partial-coherent (full-coherent not support), the UE is able to share power between SRS ports belonging to the same SRS port group only. And, maximum two PT-RSs can be defined. In this case, UE and/or gNB assume $00^{th}$ row of Table 16 as default.

For other example, when a UE reports that the UE supports non-coherent (full-coherent not support), it is assumed that power sharing is unavailable between antenna ports and 01 th row is assumed as default.

Additionally, a UE determine default value like below.

<1> Alt 1

Herein, it is assumed that PUSCH to PTRS power ratio per layer per RE is determined based on below equation and table.

PUSCH to PTRS power ratio per layer per RE=−A    [equation 13]

TABLE 17

|  |  | # of PUSCH layers | | | |
| --- | --- | --- | --- | --- | --- |
| A [dB] |  | 1 | 2 | 3 | 4 |
| RRC parameter | 00 | 0 | 3 | 4.77 | 6 |
|  | 01 | 0 | 0 | 0 | 0 |
|  | 10 |  |  | reserved |  |
|  | 11 |  |  | reserved |  |

A UE reporting full-coherent uses 00 as a default value.

A UE reporting partial-coherent/non-coherent uses 01 as a default value. (i.e., Power boosting between layers and power boosting according to the number of PT-RS ports are not supported.)

<2> Alt 2

Herein, it is assumed that PUSCH to PTRS power ratio per layer per RE is determined based on below equation and table.

PUSCH to PTRS power ratio per layer per RE=−A    [equation 14]

TABLE 15

|  |  | # of PUSCH layers | | | |
| --- | --- | --- | --- | --- | --- |
| A [dB] |  | 1 | 2 | 3 | 4 |
| RRC parameter | 00 | 0 | 3 | 4.77 | 6 |
|  | 01 | 0 | 3 | 3 | 3 |
|  | 10 | 0 | 0 | 0 | 0 |
|  | 11 |  |  | reserved |  |

A UE reporting full-coherent uses 00 as a default value.

A UE reporting partial-coherent uses 01 as a default value.

Herein, in case of the partial-coherent, when two layers belong to the same SRS port group, it is able to perform 3 dB boosting via power borrowing between layers. And, although two layers belong to a different SRS port group, if two PT-RS ports are defined, the UE is able to perform 3 dB boosting.

A UE reporting non-coherent uses 10 as a default value.

Herein, In case of the non-coherent, when two layers belong to a different SRS port group, it is able to perform 3 dB boosting. However, although two layers belong to the same SRS port group, it is unable to perform power borrowing between layers. Therefore, the UE uses 10 as a default value. In this case, it may be configured that it is able to perform power boosting only when the number of UL PT-RS ports corresponds to 2.

CONCLUSION

Figure 13:
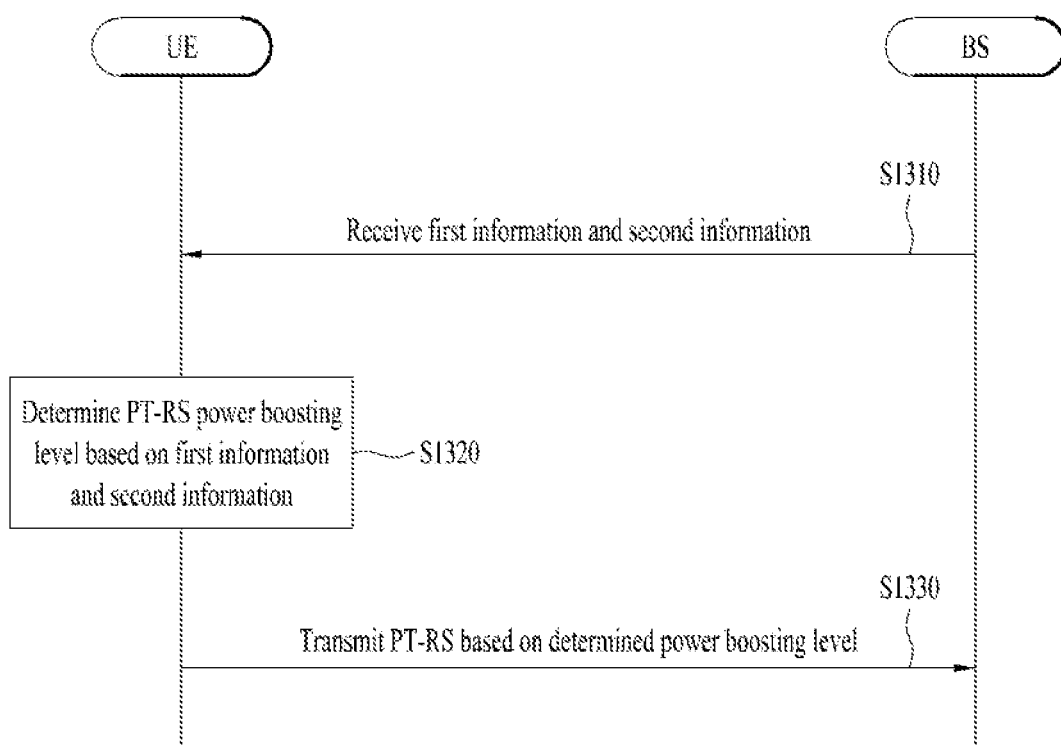
FIG. 13 is a diagram briefly illustrating an operation of transmitting and receiving a UL PT-RS between a UE and a base station applicable to the present invention.
Figure 14:
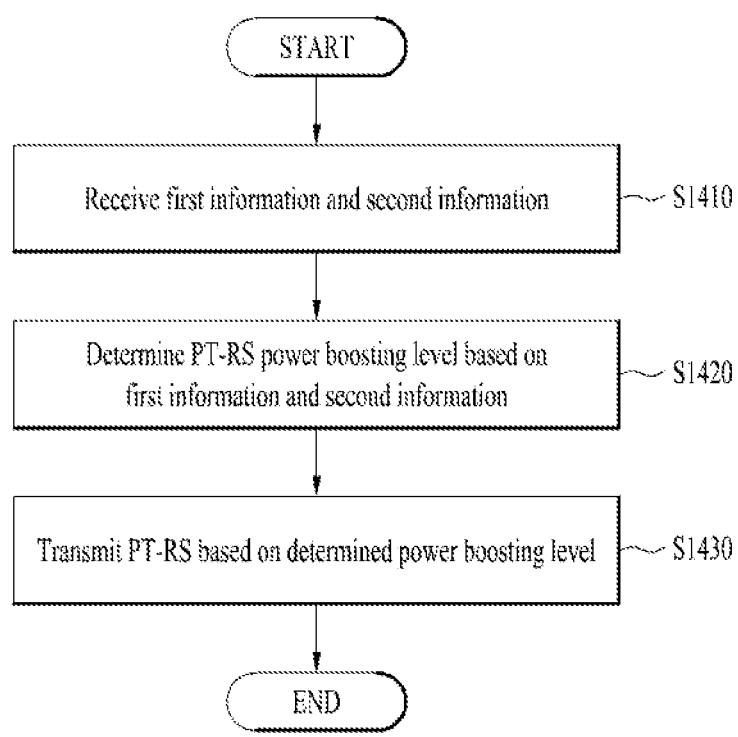
FIG. 14 is a flowchart illustrating a method of transmitting a UL PT-RS of a UE applicable to the present invention.

FIG. 13 is a diagram briefly illustrating an operation of transmitting and receiving a UL PT-RS between a UE and a base station applicable to the present invention, and FIG. 14 is a flowchart illustrating a method of transmitting a UL PT-RS of a UE applicable to the present invention.

A UE receives from a base station, first information regarding power boosting for transmission of the PT-RS and second information regarding a precoding matrix for transmission of a Physical Uplink Shared Channel (PUSCH) [S1310, S1410].

The UE determines a power boosting level based on the first information and the second information [S1320, S1420]. Herein, the power boosting level is related to a ratio of PUSCH power to PT-RS power per layer and per resource element (RE).

In particular, the determining the power boosting level based on the first information and the second information by the UE comprises that based on the precoding matrix indicated by the second information being a partial coherent precoding matrix or a non-coherent precoding matrix, the UE determines the power boosting level based on a number of PT-RS ports.

The UE transmits the PT-RS using the determined power boosting level to the base station [S1330, S1430].

Herein, the first information may indicate a plurality of power boosting levels. In this case, the determining the power boosting level based on the first information and the second information by the UE may comprise that the UE determines based on the second information, one of the plurality of power boosting levels.

In particular, determining the power boosting level based on the first information and the second information by the UE may comprise that based on the second information indicating the partial coherent precoding matrix the UE determines the power boosting level as a first power boosting level from among the plurality of power boosting levels indicated by the first information, or based on the second information indicating the non-coherent precoding matrix the UE determines the power boosting level as a second power boosting level different from the first power boosting level, from among the plurality of power boosting levels indicated by the first information.

In the present invention, determining the power boosting level based on the number of PT-RS ports by the UE may comprise that based on the second information indicating the partial coherent precoding matrix, and the number of PT-RS ports being equal to 1, the UE determines the power boosting level to be 0 dB in a state in which a number of PUSCH layers is equal to 2 or 3, or the UE determines the power boosting level to be 3 dB in a state in which a number of PUSCH layers is equal to 4.

In the present invention, determining the power boosting level based on the number of PT-RS ports by the UE may comprise that based on the second information indicating the partial coherent precoding matrix, and the number of PT-RS ports being equal to 2, the UE determines the power boosting level to be 3 dB in a state in which a number of PUSCH layers is equal to 2 or 3, or the UE determines the power boosting level to be 6 dB in a state in which a number of PUSCH layers is equal to 4.

In the present invention, determining the power boosting level based on the number of PT-RS ports by the UE may comprise that based on the second information indicating the non-coherent precoding matrix, and the number of PT-RS ports being equal to 1, the UE determines the power boosting level to be 0 dB.

In the present invention, determining the power boosting level based on the number of PT-RS ports by the UE may comprise that based on the second information indicating the non-coherent precoding matrix, and the number of PT-RS ports being equal to 2, the UE determines the power boosting level to be 3 dB.

In the present invention, the second information may relate to a transmit rank indicator (TRI) and a transmit precoding matrix indicator (TPMI) for the precoding matrix for the transmission of the PUSCH.

In particular, the second information may indicate whether the precoding matrix for the transmission of the PUSCH is the partial coherent precoding matrix or the non-coherent precoding matrix.

Additionally, the UE may determine that the transmission of the PUSCH is non-codebook based, and based on the transmission of the PUSCH being non-codebook based, the UE may determine the power boosting level based on the number of PT-RS ports by:
based on the number of PT-RS ports being equal to 1, determining the power boosting level to be 0 dB
based on the number of PT-RS ports being equal to 2, determining the power boosting level to be 3 dB.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

3. Device Configuration

Figure 15:
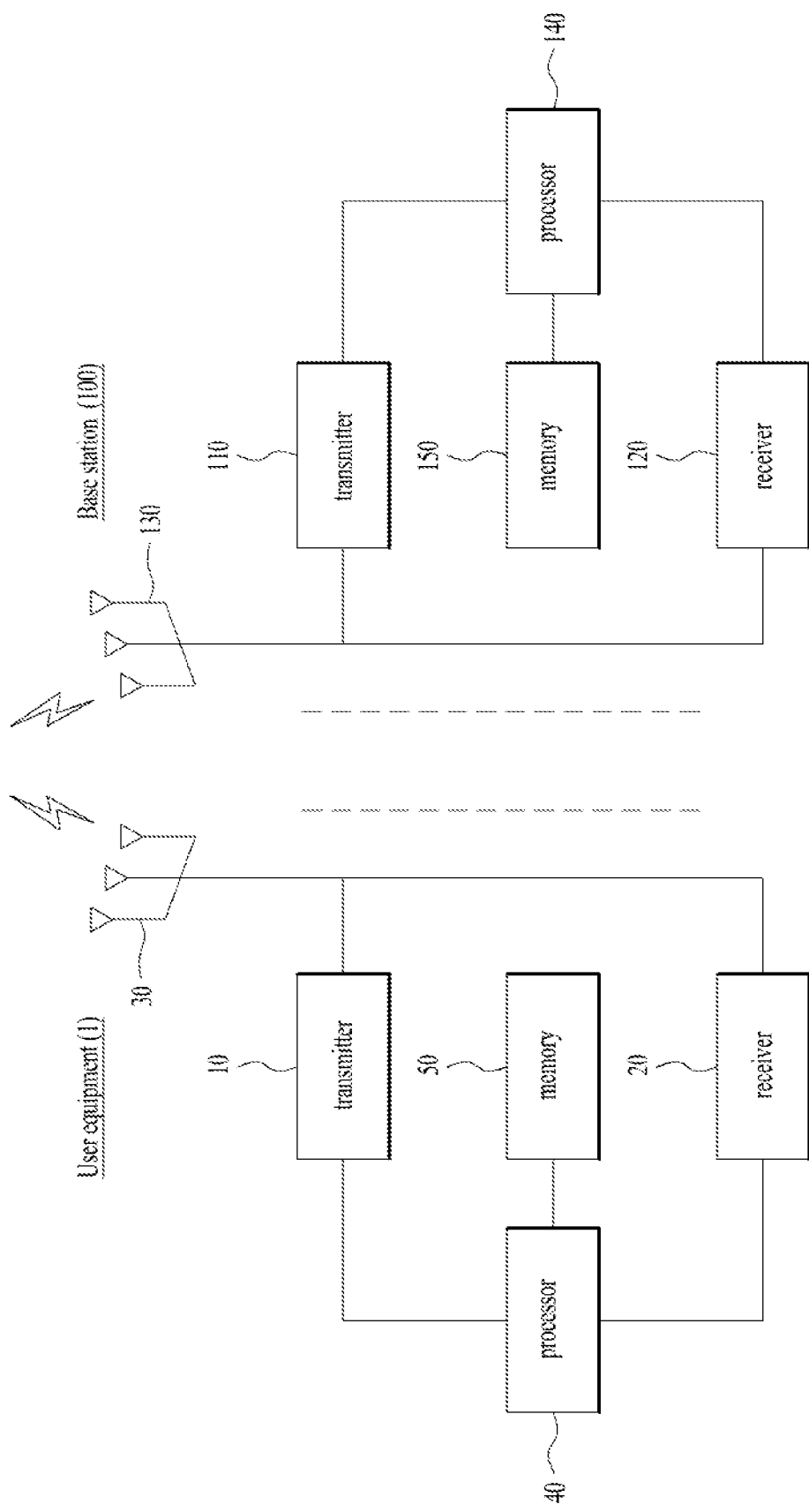
FIG. 15 is a diagram illustrating configurations of a UE and a base station capable of implementing embodiments of the present invention.

FIG. 15 is a diagram illustrating configurations of a UE and a base station capable of being implemented by the embodiments proposed in the present invention. The UE and the base station shown in FIG. 15 operate to implement the embodiments for a method of transmitting and receiving a phase tracking reference signal between the base station and the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages. Herein, a radio frequency (RF) module means a component including the Transmitter and the Receiver, and etc.

Each of the UE and the base station includes a processor 40 or 140 for performing the aforementioned embodiments of the present invention. The processor 40 or 140 can be configured to implement the aforementioned explanation/proposed procedure and/or methods by controlling a memory 50 or 150, a transmitter 10 or 110, and/or a receiver 20 or 120.

For example, the processor 40 or 140 includes a communication modem designed to implement a wireless communication technology (e.g., LTE, NR). The memory 50 or 150 is connected with the processor 40 or 140 and stores various information related to an operation of the processor 40 or 140. For example, the memory 50 or 150 can perform all or a part of processes controlled by the processor 40 or 140 or store a software code including commands for performing the aforementioned explanation/proposed procedure and/or methods. The transmitter 10 or 110 and/or the receiver 20 or 120 are connected with the processor 40 or 140 and transmit and/or receive a radio signal. In this case, the processor 40 or 140 and the memory 50 or 150 may correspond to a part of a processing chip (e.g., System on a Chip (SoC)).

In particular, A user equipment according to the present invention comprises a radio frequency (RF) module; at least one processor; and at least one computer memory operably connectable to the at least one processor and storing instructions that, when executed, cause the at least one processor to perform below operations.

In this case, before mentioned operations comprises that the at least one processor, receives through the RF module and from a base station, first information regarding power boosting for transmission of the PT-RS and second information regarding a precoding matrix for transmission of a Physical Uplink Shared Channel (PUSCH), determines a power boosting level based on the first information and the second information, wherein the power boosting level is related to a ratio of PUSCH power to PT-RS power per layer and per resource element (RE), and transmits through the RF module and to the base station, the PT-RS using the determined power boosting level. Herein, the determining the power boosting level based on the first information and the second information comprises, based on the precoding matrix indicated by the second information being a partial coherent precoding matrix or a non-coherent precoding matrix, determining the power boosting level based on a number of PT-RS ports.

Herein, the first information may indicate a plurality of power boosting levels. In this case, the determining the power boosting level based on the first information and the second information by the at least one processor may comprise that the at least one processor determines based on the second information, one of the plurality of power boosting levels.

In particular, determining the power boosting level based on the first information and the second information by the at least one processor may comprise that based on the second information indicating the partial coherent precoding matrix the at least one processor determines the power boosting level as a first power boosting level from among the plurality of power boosting levels indicated by the first information, or based on the second information indicating the non-coherent precoding matrix the at least one processor determines the power boosting level as a second power boosting level different from the first power boosting level, from among the plurality of power boosting levels indicated by the first information.

In the present invention, determining the power boosting level based on the number of PT-RS ports by the at least one processor may comprise that based on the second information indicating the partial coherent precoding matrix, and the number of PT-RS ports being equal to 1, the at least one processor determines the power boosting level to be 0 dB in a state in which a number of PUSCH layers is equal to 2 or 3, or the at least one processor determines the power boosting level to be 3 dB in a state in which a number of PUSCH layers is equal to 4.

In the present invention, determining the power boosting level based on the number of PT-RS ports by the at least one processor may comprise that based on the second information indicating the partial coherent precoding matrix, and the number of PT-RS ports being equal to 2, the at least one processor determines the power boosting level to be 3 dB in a state in which a number of PUSCH layers is equal to 2 or 3, or the at least one processor determines the power boosting level to be 6 dB in a state in which a number of PUSCH layers is equal to 4.

In the present invention, determining the power boosting level based on the number of PT-RS ports by the at least one processor may comprise that based on the second information indicating the non-coherent precoding matrix, and the number of PT-RS ports being equal to 1, the at least one processor determines the power boosting level to be 0 dB.

In the present invention, determining the power boosting level based on the number of PT-RS ports by the at least one processor may comprise that based on the second information indicating the non-coherent precoding matrix, and the number of PT-RS ports being equal to 2, the at least one processor determines the power boosting level to be 3 dB.

In the present invention, the second information may relate to a transmit rank indicator (TRI) and a transmit precoding matrix indicator (TPMI) for the precoding matrix for the transmission of the PUSCH.

In particular, the second information may indicate whether the precoding matrix for the transmission of the PUSCH is the partial coherent precoding matrix or the non-coherent precoding matrix.

Additionally, the at least one processor may determine that the transmission of the PUSCH is non-codebook based, and based on the transmission of the PUSCH being non-codebook based, the at least one processor may determine the power boosting level based on the number of PT-RS ports by:
based on the number of PT-RS ports being equal to 1, determining the power boosting level to be 0 dB
based on the number of PT-RS ports being equal to 2, determining the power boosting level to be 3 dB.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

What is claimed is:

1. A method of transmitting a phase tracking reference signal (PT-RS) by a user equipment (UE) in a wireless communication system, the method comprising:
obtaining precoding matrix information for transmission of a Physical Uplink Shared Channel (PUSCH); and
transmitting, to a base station, the PT-RS based on power boosting level determined based on the precoding matrix information, wherein the power boosting level is related to a ratio of PUSCH power to PT-RS power per layer and per resource element (RE), wherein the power boosting level is determined based on an actual number of PT-RS ports for the UE, based on that the precoding matrix information relates to a partial coherent precoding matrix or a non-coherent matrix, wherein, based on that a higher layer parameter related to a number of PT-RS ports equals to 2, the actual number of PT-RS ports is determined based on that:

sounding reference signal (SRS) port 0 and 2 related to the precoding matrix information share PT-RS port 0, SRS port 1 and 3 related to the precoding matrix information share PT-RS port 1.

2. The method of claim 1, wherein the precoding matrix information is obtained via downlink control information (DCI).

3. The method of claim 1, wherein, based on that (i) the precoding matrix information relates to the partial coherent precoding matrix and (ii) the actual number of PT-RS ports equals to 1:

the power boosting level is determined to be 0 dB in a case where the number of PUSCH layers equals to 2 or 3, or the power boosting level is determined to be 3 dB in a case where the number of PUSCH layers equals to 4.

4. The method of claim 1, wherein, based on that (i) the precoding matrix information relates to the partial coherent precoding matrix and (ii) the actual number of PT-RS ports equals to 2:

the power boosting level is determined to be 3 dB in a case where the number of PUSCH layers equals to 2 or 3, or the power boosting level is determined to be 6 dB in a case where the number of PUSCH layers equals to 4.

5. The method of claim 1, wherein based on that (i) the precoding matrix information relates to the non-coherent precoding matrix and (ii) the actual number of PT-RS ports equals to 1, the power boosting level is determined to be 0 dB.

6. The method of claim 1, wherein, based on that (i) the precoding matrix information relates to the non-coherent precoding matrix and (ii) the actual number of PT-RS ports equals to 2, the power boosting level is determined to be 3 dB.

7. The method of claim 1, wherein the precoding matrix information relates to a transmit rank indicator (TRI) and a transmit precoding matrix indicator (TPMI).

8. The method of claim 7, wherein the precoding matrix information relates to the partial coherent precoding matrix, or the non-coherent precoding matrix.

9. The method of claim 1, wherein the partial coherent precoding matrix is a matrix having at least two non-zero elements and at least one zero element in any column of the matrix.

10. The method of claim 1, wherein the non-coherent precoding matrix is a matrix having only one non-zero element in columns of the matrix.

11. A user equipment (UE) configured to transmit a phase tracking reference signal (PT-RS) in a wireless communication system, the UE comprising:

a radio frequency (RF) module;
at least one processor; and
at least one computer memory operably connectable to the at least one processor and storing instructions that, when executed, cause the at least one processor to perform operations comprising:

obtaining precoding matrix information for transmission of a Physical Uplink Shared Channel (PUSCH); and transmitting, to a base station, the PT-RS based on power boosting level determined based on the precoding matrix information, wherein the power boosting level is related to a ratio of PUSCH power to PT-RS power per layer and per resource element (RE), wherein the power boosting level is determined based on an actual number of PT-RS ports for the UE, based on that the precoding matrix information relates to a partial coherent precoding matrix or a non-coherent matrix, wherein, based on that a higher layer parameter related to a number of PT-RS ports equals to 2, the actual number of PT-RS ports is determined based on that:

sounding reference signal (SRS) port 0 and 2 related to the precoding matrix information share PT-RS port 0, SRS port 1 and 3 related to the precoding matrix information share PT-RS port 1.

12. The UE of claim 11, wherein the precoding matrix information is obtained via downlink control information (DCI).

13. The UE of claim 11, wherein, based on that (i) the precoding matrix information relates to the partial coherent precoding matrix and (ii) the actual number of PT-RS ports equals to 1:

the power boosting level is determined to be 0 dB in a case where the number of PUSCH layers equals to 2 or 3, or the power boosting level is determined to be 3 dB in a case where the number of PUSCH layers equals to 4.

14. The UE of claim 11, wherein, based on that (i) the precoding matrix information relates to the partial coherent precoding matrix and (ii) the actual number of PT-RS ports equals to 2:

the power boosting level is determined to be 3 dB in a case where the number of PUSCH layers equals to 2 or 3, or the power boosting level is determined to be 6 dB in a case where the number of PUSCH layers equals to 4.

15. The UE of claim 11, wherein based on that (i) the precoding matrix information relates to the non-coherent precoding matrix and (ii) the actual number of PT-RS ports equals to 1, the power boosting level is determined to be 0 dB.

16. The UE of claim 11, wherein, based on that (i) the precoding matrix information relates to the non-coherent precoding matrix and (ii) the actual number of PT-RS ports equals to 2, the power boosting level is determined to be 3 dB.

17. The UE of claim 11, wherein the precoding matrix information relates to a transmit rank indicator (TRI) and a transmit precoding matrix indicator (TPMI).

18. The UE of claim 17, wherein the precoding matrix information relates to the partial coherent precoding matrix, or the non-coherent precoding matrix.

19. The UE of claim 11, wherein the partial coherent precoding matrix is a matrix having at least two non-zero elements and at least one zero element in any column of the matrix.

20. The UE of claim 11, wherein the non-coherent precoding matrix is a matrix having only one non-zero element in columns of the matrix.

* * * * *